United States Patent
Wu et al.

(10) Patent No.: US 10,361,896 B2
(45) Date of Patent: Jul. 23, 2019

(54) DATA COMMUNICATION METHOD, RELATED DEVICE, AND COMMUNICATIONS SYSTEM

(71) Applicant: Huawei Technologies Co., Ltd., Shenzhen (CN)

(72) Inventors: Yiqun Wu, Shanghai (CN); Shunqing Zhang, Shenzhen (CN); Yan Chen, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 202 days.

(21) Appl. No.: 15/473,085

(22) Filed: Mar. 29, 2017

(65) Prior Publication Data

US 2017/0201406 A1 Jul. 13, 2017

Related U.S. Application Data

(63) Continuation of application No. PCT/CN2014/088042, filed on Sep. 30, 2014.

(51) Int. Cl.
*H04L 27/26* (2006.01)
*H04B 7/26* (2006.01)
(Continued)

(52) U.S. Cl.
CPC ............ *H04L 27/2615* (2013.01); *H04B 7/26* (2013.01); *H04J 11/0043* (2013.01); *H04W 52/42* (2013.01)

(58) Field of Classification Search
CPC ....... H04B 7/26; H04L 27/2615; H04L 27/34; H04L 27/26
See application file for complete search history.

(56) References Cited

U.S. PATENT DOCUMENTS 6,810,007 B1 10/2004 Kim
2010/0322343 A1* 12/2010 Yeon ................... H04B 7/0447
375/295

(Continued)

FOREIGN PATENT DOCUMENTS

CN 1273466 A 11/2000
CN 101006672 A 7/2007
(Continued)

OTHER PUBLICATIONS

Hosein Nikopour et al., "Sparse Code Multiple Access", 2013 IEEE 24th International Symposium on Personal, Indoor and Mobile Radio Communications: Fundamentals and PHY Track, pp. 332-336.

(Continued)

*Primary Examiner* — Anez C Ebrahim
(74) *Attorney, Agent, or Firm* — Slater Matsil, LLP

(57) ABSTRACT

Embodiments of the present invention provide a data communication method and a related device. The data communication method may include performing, by a first communications device, power adjustment on Q codebooks using Q power factors, to obtain power-adjusted Q codebooks, where Q is a positive integer, and the Q power factors and the Q codebooks are in a one-to-one correspondence and mapping, by the first communications device, Q to-be-transmitted bit sequences to Q codewords in the power-adjusted Q codebooks, where the Q bit sequences and the Q codewords are in a one-to-one correspondence. The method also includes obtaining, by the first communications device, a modulation symbol based on the Q codewords and sending, by the first communications device, the modulation symbol on a resource block.

24 Claims, 13 Drawing Sheets

(51) Int. Cl.
  *H04J 11/00*   (2006.01)
  *H04W 52/42*   (2009.01)

(56) References Cited

U.S. PATENT DOCUMENTS

| | | |
|---|---|---|
| 2011/0081935 A1 | 4/2011 | Yeon et al. |
| 2011/0090985 A1 | 4/2011 | Zhou et al. |
| 2011/0274209 A1 | 11/2011 | Khojastepour |
| 2012/0057646 A1 | 3/2012 | Jovicic |

FOREIGN PATENT DOCUMENTS

| | | |
|---|---|---|
| CN | 101984722 A | 3/2011 |
| CN | 102232319 A | 11/2011 |
| CN | 102550091 A | 7/2012 |
| CN | 102804623 A | 11/2012 |
| CN | 103378889 A | 10/2013 |
| CN | 103701511 A | 4/2014 |
| CN | 103780360 A | 5/2014 |
| WO | 2012106832 A1 | 8/2012 |
| WO | 2015113258 A1 | 8/2015 |

OTHER PUBLICATIONS

F. Wathan et al., "Dynamic Grouped Chip-Level Iterated Multiuser Detection Based on Gaussian Forcing Technique", IEEE Communications Letters, vol. 12, No. 3, Mar. 2008, pp. 167-169.

* cited by examiner

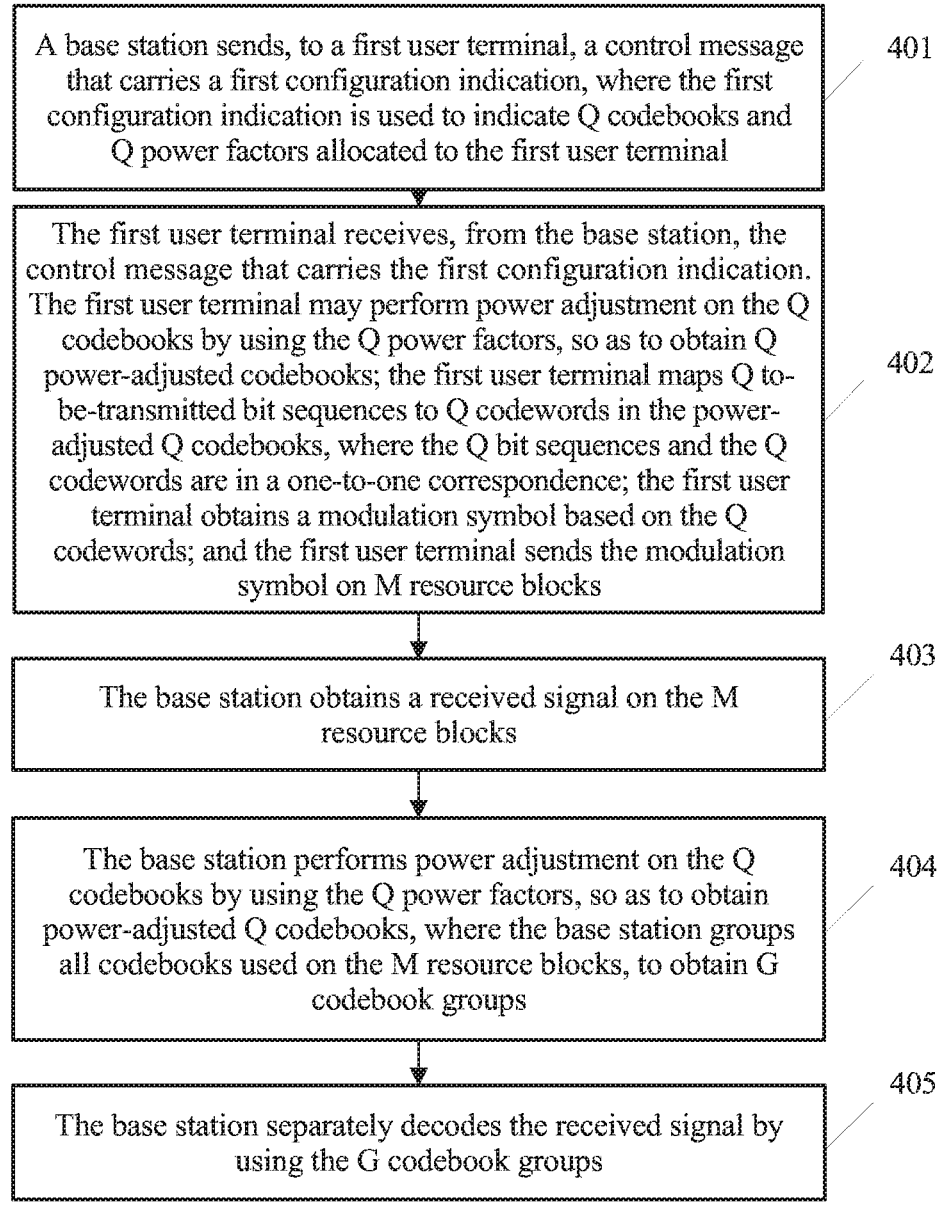
FIG. 4-a

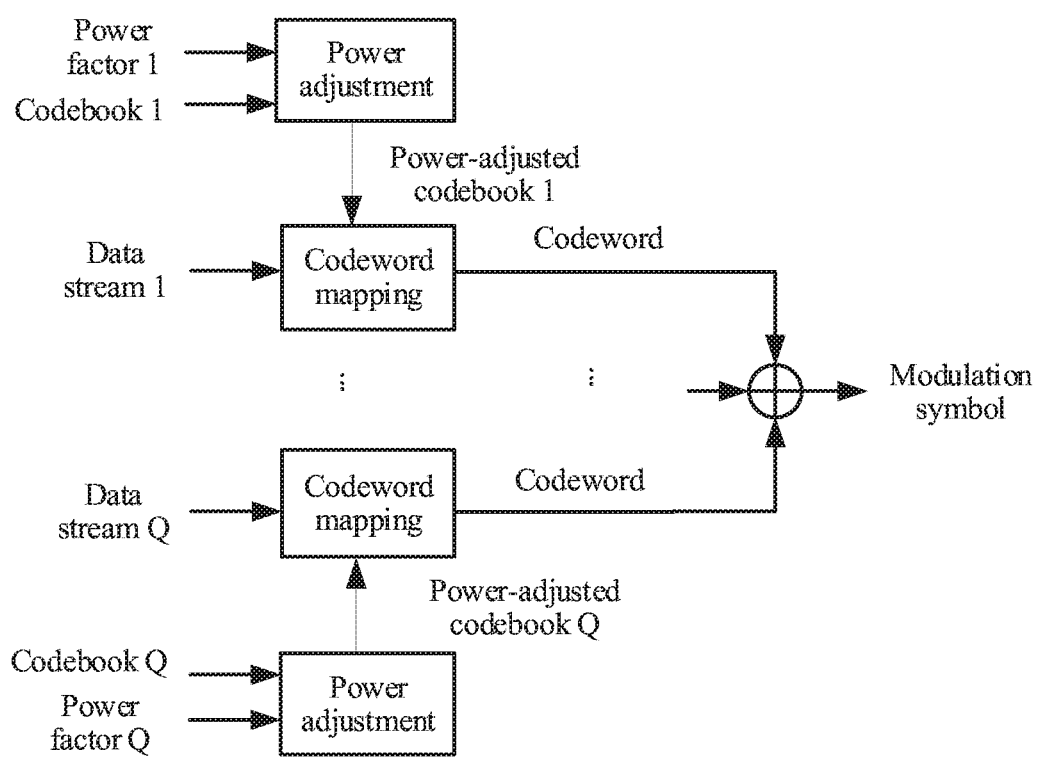
FIG. 4-b

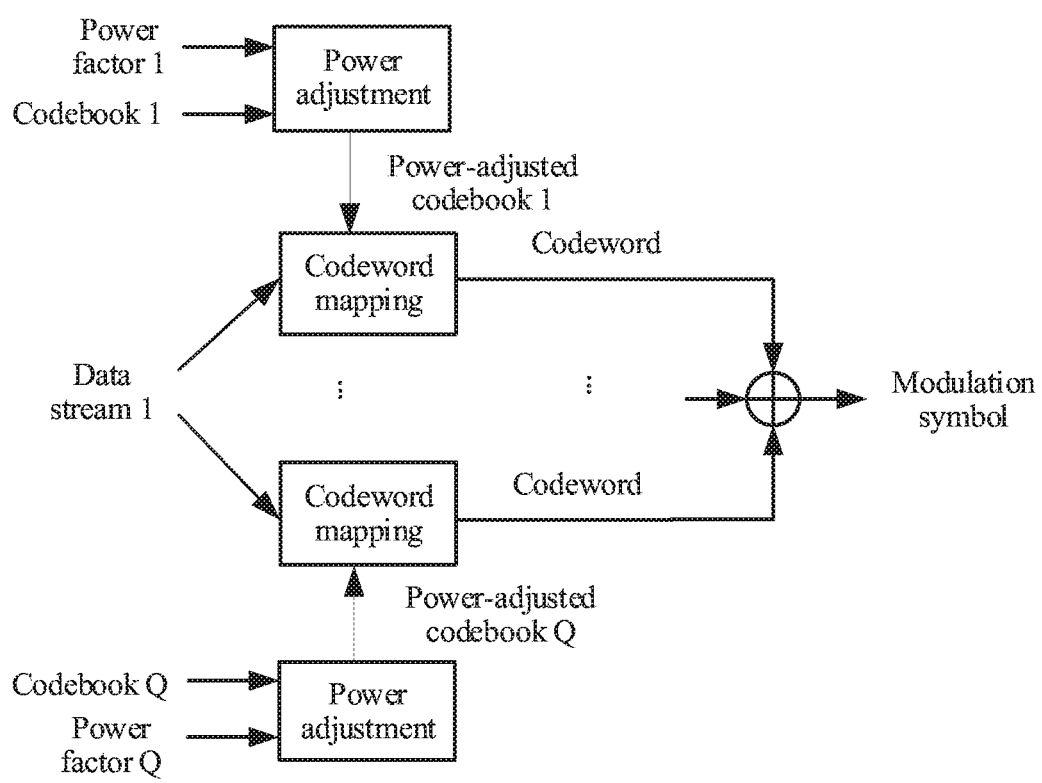
FIG. 4-c

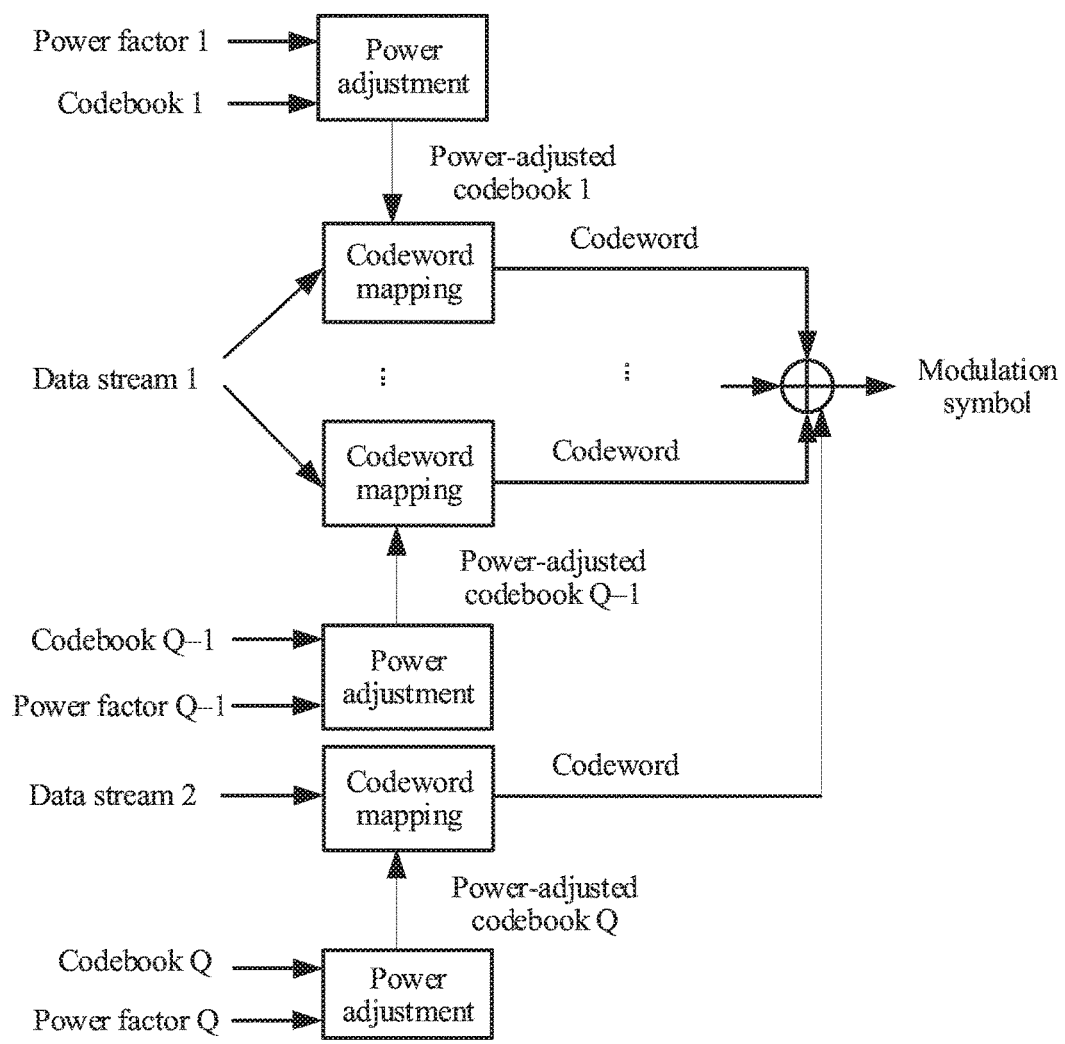
FIG. 4-d

| Bit sequence | Codewords in a codebook 1 |
|---|---|
| 00 → | $(0, 1+i, -1-i, 0)^T$ |
| 01 → | $(0, 1-i, -1+i, 0)^T$ |
| 11 → | $(0, -1+i, 1-i, 0)^T$ |
| 10 → | $(0, -1-i, 1+i, 0)^T$ |

| Bit sequence | Codewords in a codebook 2 |
|---|---|
| 00 → | $(0, 0.5+0.5i, -0.5-0.5i, 0)^T$ |
| 01 → | $(0, 0.5-0.5i, -0.5+0.5i, 0)^T$ |
| 11 → | $(0, -0.5+0.5i, 0.5-0.5i, 0)^T$ |
| 10 → | $(0, -0.5-0.5i, 0.5+0.5i, 0)^T$ |

FIG. 4-e

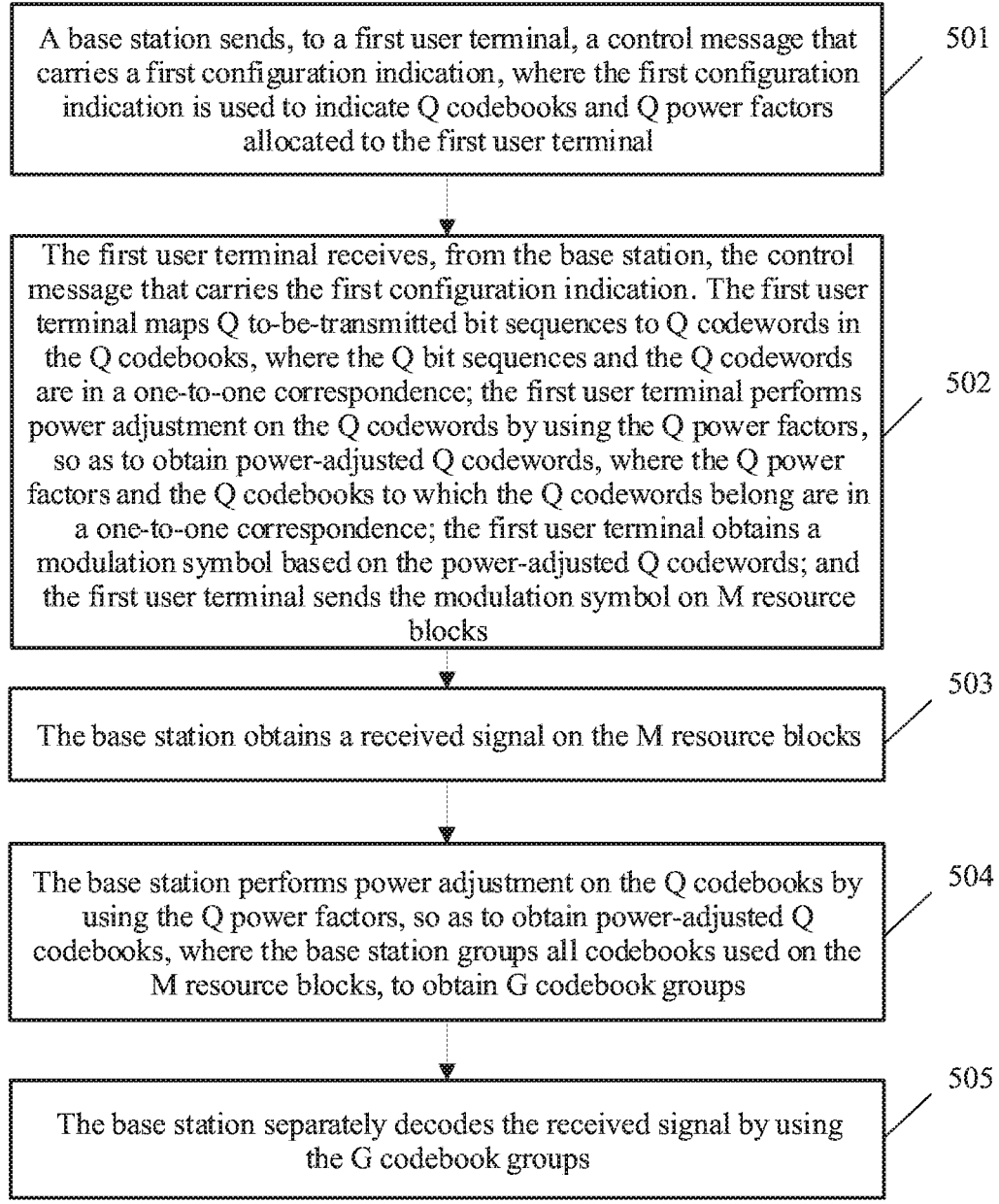
FIG. 5-a

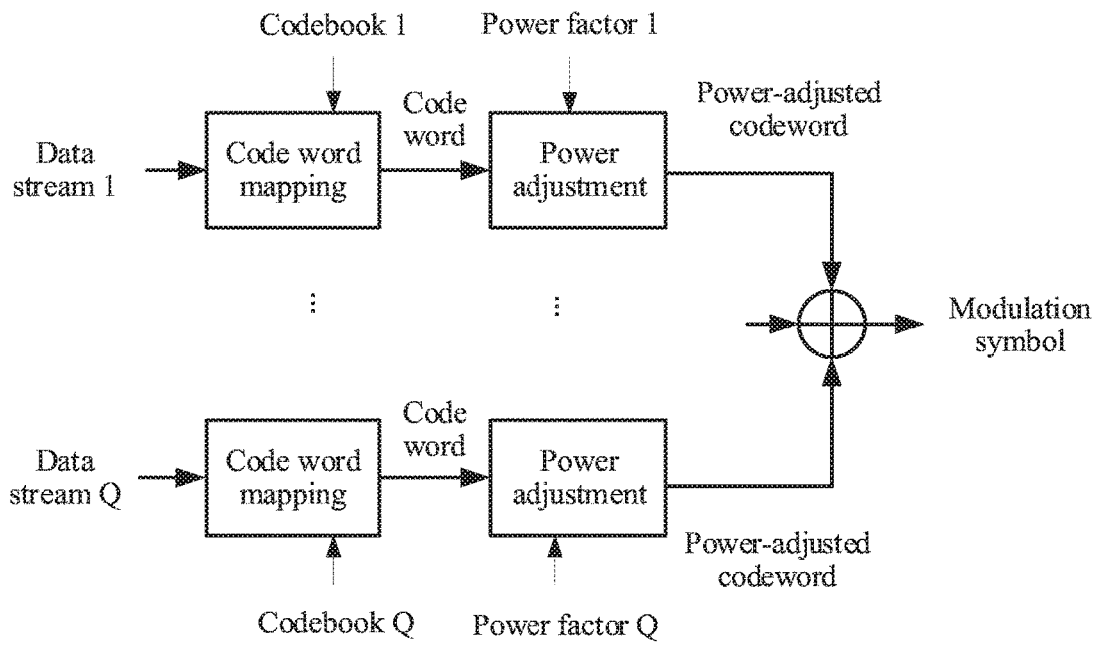
FIG. 5-b
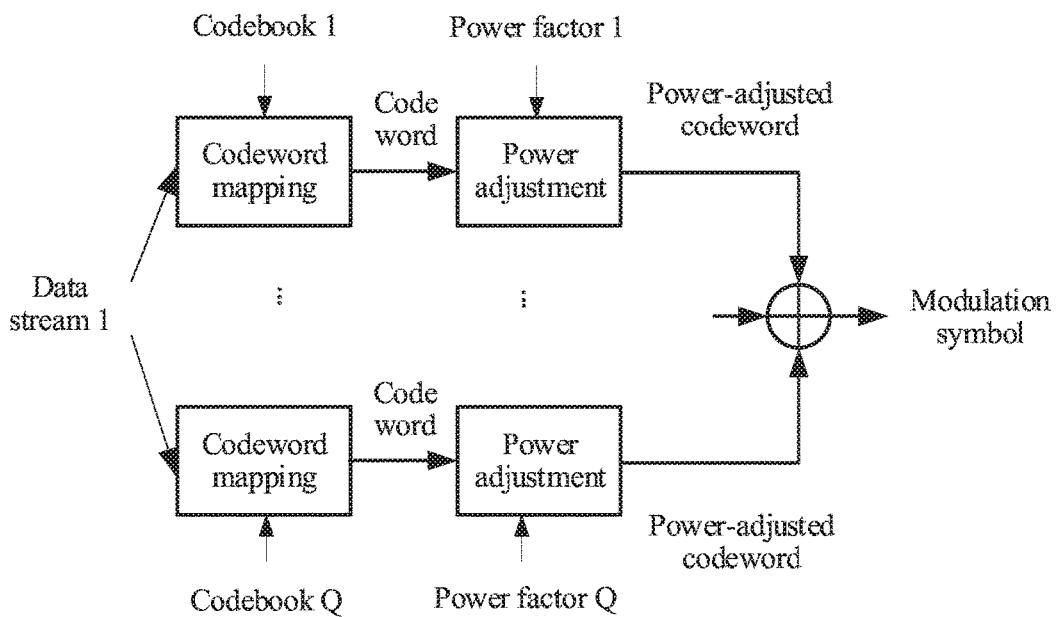
FIG. 5-c

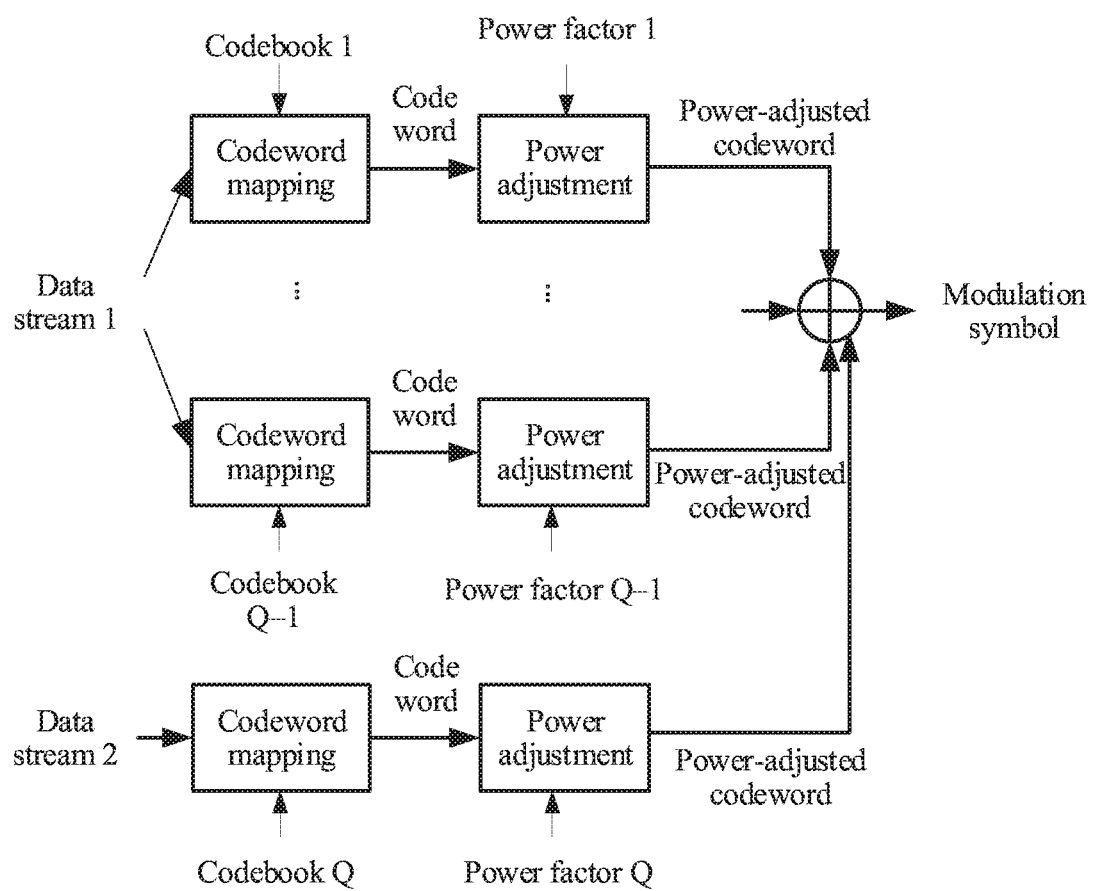
FIG. 5-d

DATA COMMUNICATION METHOD, RELATED DEVICE, AND COMMUNICATIONS SYSTEM

CROSS-REFERENCE TO RELATED APPLICATIONS

This application is a continuation of International Application No. PCT/CN2014/088042, filed on Sep. 30, 2014 the disclosure of which is hereby incorporated by reference in its entirety.

TECHNICAL FIELD

The present embodiments relate to the field of communications technologies, and specifically, to a data communication method, a related device, and a related communications system.

BACKGROUND

Sparse code multiple access (SCMA for short) is a new multiple access manner. In this multiple access manner, multiple users use a same resource block (RB for short). Each resource block includes several resource elements (RE for short). One RE may be a subcarrier-symbol resource element in an orthogonal frequency division multiplexing (OFDM for short) technology, or may be a time-frequency resource element in another air interface technology. A communications system that uses the SCMA access manner may be referred to as an SCMA system.

A codebook is an important resource that needs to be used in data communication. A single codebook generally includes multiple codewords, and multiple codebooks may be used at the same time. In a conventional communications system, such as an SCMA system, powers of multiple codebooks used at the same time are equal. When decoding a received signal, a conventional receiver (the receiver may be a base station or a user terminal) references all possible codebooks at the same time. Because powers of all the possible codebooks referenced at the same time are equal, decoding quality cannot be ensured. In addition, when there is a relatively large quantity of possible codebooks, complexity of a signal decoding operation at the receiver is relatively high. For example, when there are hundreds of possible codebooks, the complexity of the signal decoding operation at the receiver is extremely high.

SUMMARY

Embodiments of the present invention provide a data communication method, a related device, and a communications system, so as to reduce complexity of a signal decoding operation at a receiver in a communications system and improve signal decoding quality at the receiver.

A first aspect of the present embodiments provides a data communication method, including performing, by a first communications device, power adjustment on Q codebooks by using Q power factors, so as to obtain power-adjusted Q codebooks, where Q is a positive integer, and the Q power factors and the Q codebooks are in a one-to-one correspondence and mapping, by the first communications device, Q to-be-transmitted bit sequences to Q codewords in the power-adjusted Q codebooks, where the Q bit sequences and the Q codewords are in a one-to-one correspondence. The method also includes obtaining, by the first communications device, a modulation symbol based on the Q codewords and sending, by the first communications device, the modulation symbol on a resource block.

With reference to the first aspect, in a first possible implementation manner of the first aspect, the performing power adjustment on Q codebooks by using Q power factors, so as to obtain power-adjusted Q codebooks includes performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

With reference to the first aspect or the first possible implementation manner of the first aspect, in a second possible implementation manner of the first aspect, the Q power factors are selected from a candidate power factor set that includes M candidate power factors.

With reference to the first aspect or the first possible implementation manner of the first aspect, in a third possible implementation manner of the first aspect, a power factor i in the Q power factors and a codebook j in the Q codebooks are in a one-to-one correspondence, where a value of the power factor i is determined based on a code rate of the codebook j and/or a modulation order of the codebook j.

With reference to the first aspect, the first possible implementation manner of the first aspect, the second possible implementation manner of the first aspect, or the third possible implementation manner of the first aspect, in a fourth possible implementation manner of the first aspect, each bit sequence of the Q bit sequences is captured from a different data stream of Q data streams.

With reference to the first aspect, the first possible implementation manner of the first aspect, the second possible implementation manner of the first aspect, the third possible implementation manner of the first aspect, or the fourth possible implementation manner of the first aspect, in a fifth possible implementation manner of the first aspect, the Q codebooks are sparse code multiple access (SCMA) codebooks, where a codeword in the Q codebooks is a complex number vector.

With reference to the first aspect, the first possible implementation manner of the first aspect, the second possible implementation manner of the first aspect, the third possible implementation manner of the first aspect, the fourth possible implementation manner of the first aspect, or the fifth possible implementation manner of the first aspect, in a sixth possible implementation manner of the first aspect, the Q power factors are different from each other or some of the power factors are identical.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, or the sixth possible implementation manner of the first aspect, in a seventh possible implementation manner of the first aspect, before the performing power adjustment on Q codebooks by using Q power factors, so as to obtain power-adjusted Q codebooks, the method further includes: receiving, by the first communications device, codebook configuration information, where the codebook configuration information is used to indicate the Q codebooks and the Q power factors allocated to the first communications device.

With reference to the first aspect, the first possible implementation manner of the first aspect, the second possible implementation manner of the first aspect, the third possible implementation manner of the first aspect, the fourth possible implementation manner of the first aspect, the fifth possible implementation manner of the first aspect, the sixth possible implementation manner of the first aspect, or the seventh possible implementation manner of the first aspect, in an eighth possible implementation manner of the first aspect, the first communications device is a base station or a user terminal.

A second aspect of the present embodiments provides a data communication method, including mapping, by a first communications device, Q to-be-transmitted bit sequences to Q codewords in Q codebooks, where Q is a positive integer, and the Q bit sequences and the Q codewords are in a one-to-one correspondence and performing, by the first communications device, power adjustment on the Q codewords by using Q power factors, so as to obtain power-adjusted Q codewords, where the Q power factors and the Q codebooks to which the Q codewords belong are in a one-to-one correspondence. The method also includes obtaining, by the first communications device, a modulation symbol based on the power-adjusted Q codewords; and sending, by the first communications device, the modulation symbol on a resource block.

With reference to the second aspect, in a first possible implementation manner of the second aspect, the performing power adjustment on the Q codewords by using Q power factors, so as to obtain power-adjusted Q codewords includes performing power adjustment on the Q codewords by using the Q power factors according to a power adjustment formula:

$$\bar{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\bar{x}_k(g)$ in the power adjustment formula represents a power-adjusted codeword obtained by performing power adjustment on $x_k(g)$ by using $\alpha_k$.

With reference to the second aspect or the first possible implementation manner of the second aspect, in a second possible implementation manner of the second aspect, the Q power factors are selected from a candidate power factor set that includes M candidate power factors.

With reference to the second aspect or the first possible implementation manner of the second aspect, in a third possible implementation manner of the second aspect, a power factor i in the Q power factors and a codebook j in the Q codebooks are in a one-to-one correspondence, where a value of the power factor i is determined based on a code rate of the codebook j and/or a modulation order of the codebook j.

With reference to the second aspect, the first possible implementation manner of the second aspect, the second possible implementation manner of the second aspect, or the third possible implementation manner of the second aspect, in a fourth possible implementation manner of the second aspect, each bit sequence of the Q bit sequences is captured from a different data stream of Q data streams.

With reference to the second aspect, the first possible implementation manner of the second aspect, the second possible implementation manner of the second aspect, the third possible implementation manner of the second aspect, or the fourth possible implementation manner of the second aspect, in a fifth possible implementation manner of the second aspect, the Q codebooks are SCMA codebooks, where a codeword in the Q codebooks is a complex number vector.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the Q power factors are different from each other or some of the power factors are identical.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, or the sixth possible implementation manner of the second aspect, in a seventh possible implementation manner of the second aspect, before the mapping Q to-be-transmitted bit sequences to Q codewords in Q codebooks, the method further includes: receiving, by the first communications device, codebook configuration information, where the codebook configuration information is used to indicate the Q codebooks and the Q power factors allocated to the first communications device.

With reference to the second aspect, the first possible implementation manner of the second aspect, the second possible implementation manner of the second aspect, the third possible implementation manner of the second aspect, the fourth possible implementation manner of the second aspect, the fifth possible implementation manner of the second aspect, the sixth possible implementation manner of the second aspect, or the seventh possible implementation manner of the second aspect, in an eighth possible implementation manner of the second aspect, the first communications device is a base station or a user terminal.

A third aspect of the present embodiments provides a data communication method, including: generating, by a second communications device, codebook configuration information; and sending, by the second communications device, the codebook configuration information to a first communications device, where the codebook configuration information is used to indicate Q codebooks and Q power factors allocated to the first communications device, and the Q codebooks and the Q power factors are in a one-to-one correspondence.

With reference to the third aspect, in a first possible implementation manner of the third aspect, the Q codebooks are SCMA codebooks, where a codeword in the Q codebooks is a complex number vector.

With reference to the third aspect or the first possible implementation manner of the third aspect, in a second possible implementation manner of the third aspect, the Q power factors are different from each other or some of the power factors are identical.

With reference to the third aspect, the first possible implementation manner of the third aspect, or the second possible implementation manner of the third aspect, in a third possible implementation manner of the third aspect, the method further includes: performing, by the second communications device, power adjustment on the Q codebooks by using the Q power factors, so as to obtain power-adjusted Q codebooks; obtaining, by the second communications device, a received signal on a resource block; and performing, by the second communications device, decoding processing on the received signal by using F codebooks, where the F codebooks are all codebooks used on the resource block, F is an integer greater than 1, and the F codebooks include the power-adjusted Q codewords.

With reference to the third possible implementation manner of the third aspect, in a fourth possible implementation manner of the third aspect, F is equal to Q.

With reference to the third possible implementation manner of the third aspect or the fourth possible implementation manner of the third aspect, in a fifth possible implementation manner of the third aspect, the performing power adjustment on the Q codebooks by using the Q power factors, so as to obtain power-adjusted Q codebooks includes: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

With reference to the third possible implementation manner of the third aspect, the fourth possible implementation manner of the third aspect, or the fifth possible implementation manner of the third aspect, in a sixth possible implementation manner of the third aspect, the performing decoding processing on the received signal by using F codebooks includes: grouping the F codebooks into G codebook groups, and separately decoding the received signal by using the G codebook groups, where each codebook group of the G codebook groups includes at least one codebook, and G is an integer greater than 1.

With reference to the sixth possible implementation manner of the third aspect, in a seventh possible implementation manner of the third aspect, the received signal obtained on the resource block is a received signal $S_i$, and the separately decoding the received signal by using the G codebook groups includes: if i is less than G, decoding the received signal $S_i$ by using the $i^{th}$ codebook group of the G codebook groups, so as to obtain a bit sequence $D_i$, performing interference cancellation processing on the received signal $S_i$ by using the bit sequence $D_i$, so as to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

With reference to the seventh possible implementation manner of the third aspect, in an eighth possible implementation manner of the third aspect, the performing interference cancellation processing on the received signal $S_i$ by using the bit sequence $D_i$, so as to obtain a received signal $S_{i+1}$, includes: mapping the bit sequence $D_i$ to $m_i$ codewords in the $i^{th}$ codebook group; obtaining a modulation symbol $X_i$ based on the $m_i$ codewords; multiplying the modulation symbol $X_i$ and a channel gain corresponding to the $i^{th}$ codebook group to obtain a product $Z_i$; and subtracting the product $Z_i$ from the received signal $S_i$ so as to obtain the received signal $S_{i+1}$.

With reference to the seventh possible implementation manner of the third aspect or the eighth possible implementation manner of the third aspect, in a ninth possible implementation manner of the third aspect, the bit sequence $D_i$ is a bit sequence whose likelihood value is the largest among $N_i$ bit sequences that are obtained by decoding the received signal $S_i$ by using the $i^{th}$ codebook group of the G codebook groups.

With reference to the sixth possible implementation manner of the third aspect, in a tenth possible implementation manner of the third aspect, the received signal obtained on the resource block is a received signal $S_i$, and the separately decoding the received signal by using the G codebook groups includes: if i is less than G, decoding the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtaining $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtaining an average modulation symbol $X_i$ based on the $N_i$ likelihood values $L_i$ and the $N_i$ modulation symbols $X_i'$, multiplying the average modulation symbol $X_i$ and a channel gain corresponding to the $i^{th}$ codebook group to obtain a product $Z_i$, subtracting the product $Z_i$ from the received signal $S_i$ to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

With reference to the sixth possible implementation manner of the third aspect, in an eleventh possible implementation manner of the third aspect, the received signal obtained on the M resource blocks is a received signal $S_i$, and the separately decoding the received signal by using the G codebook groups includes: if i is less than G, decoding the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_i$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, performing interference cancellation processing on the received signal $S_i$ by using the bit sequence $D_i$, so as to obtain a received signal $S_{i+1}$, and assigning i+1 to i; or if a cyclic redundancy check on the bit sequence $D_i$ fails, obtaining $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtaining an average modulation symbol $X_i$ based on the $N_i$ likelihood values $L_i$ and the $N_i$ modulation symbols $X_i'$, multiplying the average modulation symbol $X_i$ and a channel gain corresponding to the $i^{th}$ codebook group to obtain a product $Z_i$, subtracting the product $Z_i$ from the received signal $S_i$ to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

With reference to the sixth possible implementation manner of the third aspect, the seventh possible implementation manner of the third aspect, the eighth possible implementation manner of the third aspect, the ninth possible implementation manner of the third aspect, the tenth possible implementation manner of the third aspect, or the eleventh possible implementation manner of the third aspect, in a twelfth possible implementation manner of the third aspect, average power corresponding to the $i^{th}$ codebook group of the G codebook groups is greater than average power corresponding to the $(i+1)^{th}$ codebook group of the G codebook groups.

With reference to any one of the third aspect, or the first possible implementation manner to the twelfth possible implementation manner of the third aspect, in a thirteenth possible implementation manner of the third aspect, the first communications device is a base station, and the second communications device is a user terminal; or the second communications device is a base station, and the first communications device is a user terminal.

A fourth aspect of the present embodiments provides a communications device, including: an adjustment unit, configure to perform power adjustment on Q codebooks by using Q power factors, so as to obtain power-adjusted Q codebooks, where Q is a positive integer, and the Q power factors and the Q codebooks are in a one-to-one correspondence; a mapping unit, configured to map Q to-be-transmitted bit sequences to Q codewords in the power-adjusted Q codebooks, where the Q bit sequences and the Q codewords are in a one-to-one correspondence; a modulation unit, configured to obtain a modulation symbol based on the Q codewords; and a sending unit, configured to send the modulation symbol on a resource block.

With reference to the fourth aspect, in a first possible implementation manner of the fourth aspect, the adjustment unit is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

With reference to the fourth aspect or the first possible implementation manner of the fourth aspect, in a second possible implementation manner of the fourth aspect, the Q power factors are selected from a candidate power factor set that includes M candidate power factors.

With reference to the fourth aspect or the first possible implementation manner of the fourth aspect, in a third possible implementation manner of the fourth aspect, a power factor i in the Q power factors and a codebook j in the Q codebooks are in a one-to-one correspondence, where a value of the power factor i is determined based on a code rate of the codebook j and/or a modulation order of the codebook j.

With reference to the fourth aspect, the first possible implementation manner of the fourth aspect, the second possible implementation manner of the fourth aspect, or the third possible implementation manner of the fourth aspect, in a fourth possible implementation manner of the fourth aspect, each bit sequence of the Q bit sequences is captured from a different data stream of Q data streams.

With reference to the fourth aspect, the first possible implementation manner of the fourth aspect, the second possible implementation manner of the fourth aspect, the third possible implementation manner of the fourth aspect, or the fourth possible implementation manner of the fourth aspect, in a fifth possible implementation manner of the fourth aspect, the Q codebooks are SCMA codebooks, where a codeword in the Q codebooks is a complex number vector.

With reference to the fourth aspect, the first possible implementation manner of the fourth aspect, the second possible implementation manner of the fourth aspect, the third possible implementation manner of the fourth aspect, the fourth possible implementation manner of the fourth aspect, or the fifth possible implementation manner of the fourth aspect, in a sixth possible implementation manner of the fourth aspect, the Q power factors are different from each other or some of the power factors are identical.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, or the sixth possible implementation manner of the fourth aspect, in a seventh possible implementation manner of the fourth aspect, the communications device further includes: a receiving unit, configured to: before the adjustment unit performs power adjustment on Q codebooks by using Q power factors, so as to obtain power-adjusted Q codebooks, receive codebook configuration information, where the codebook configuration information is used to indicate the Q codebooks and the Q power factors allocated to the communications device.

With reference to the fourth aspect, the first possible implementation manner of the fourth aspect, the second possible implementation manner of the fourth aspect, the third possible implementation manner of the fourth aspect, the fourth possible implementation manner of the fourth aspect, the fifth possible implementation manner of the fourth aspect, the sixth possible implementation manner of the fourth aspect, or the seventh possible implementation manner of the fourth aspect, in an eighth possible implementation manner of the fourth aspect, the communications device is a base station or a user terminal.

A fifth aspect of the present embodiments provides a communications device, including: a mapping unit, configured to map Q to-be-transmitted bit sequences to Q codewords in Q codebooks, where Q is a positive integer, and the Q bit sequences and the Q codewords are in a one-to-one correspondence; an adjustment unit, configured to perform power adjustment on the Q codewords by using Q power factors, so as to obtain power-adjusted Q codewords, where the Q power factors and the Q codebooks to which the Q codewords belong are in a one-to-one correspondence; a modulation unit, configured to obtain a modulation symbol based on the power-adjusted Q codewords; and a sending unit, configured to send the modulation symbol on a resource block.

With reference to the fifth aspect, in a first possible implementation manner of the fifth aspect, the adjustment unit is specifically configured to perform power adjustment on the Q codewords by using the Q power factors according to a power adjustment formula:

$$\overline{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\bar{x}_k(g)$ in the power adjustment formula represents a power-adjusted codeword obtained by performing power adjustment on $x_k(g)$ by using $\alpha_k$.

With reference to the fifth aspect or the first possible implementation manner of the fifth aspect, in a second possible implementation manner of the fifth aspect, the Q power factors are selected from a candidate power factor set that includes M candidate power factors.

With reference to the fifth aspect or the first possible implementation manner of the fifth aspect, in a third possible implementation manner of the fifth aspect, a power factor i in the Q power factors and a codebook j in the Q codebooks are in a one-to-one correspondence, where a value of the power factor i is determined based on a code rate of the codebook j and/or a modulation order of the codebook j.

With reference to the fifth aspect, the first possible implementation manner of the fifth aspect, the second possible implementation manner of the fifth aspect, or the third possible implementation manner of the fifth aspect, in a fourth possible implementation manner of the fifth aspect, each bit sequence of the Q bit sequences is captured from a different data stream of Q data streams.

With reference to the fifth aspect, the first possible implementation manner of the fifth aspect, the second possible implementation manner of the fifth aspect, the third possible implementation manner of the fifth aspect, or the fourth possible implementation manner of the fifth aspect, in a fifth possible implementation manner of the fifth aspect, the Q codebooks are SCMA codebooks, where a codeword in the Q codebooks is a complex number vector.

With reference to the fifth aspect, the first possible implementation manner of the fifth aspect, the second possible implementation manner of the fifth aspect, the third possible implementation manner of the fifth aspect, the fourth possible implementation manner of the fifth aspect, or the fifth possible implementation manner of the fifth aspect, in a sixth possible implementation manner of the fifth aspect, the Q power factors are different from each other or some of the power factors are identical.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, or the sixth possible implementation manner of the fifth aspect, in a seventh possible implementation manner of the fifth aspect, the communications device further includes: a receiving unit, configured to: before the mapping unit maps Q to-be-transmitted bit sequences to Q codewords in Q codebooks, receive codebook configuration information, where the codebook configuration information is used to indicate the Q codebooks and the Q power factors allocated to the communications device.

With reference to the fifth aspect, the first possible implementation manner of the fifth aspect, the second possible implementation manner of the fifth aspect, the third possible implementation manner of the fifth aspect, the fourth possible implementation manner of the fifth aspect, the fifth possible implementation manner of the fifth aspect, the sixth possible implementation manner of the fifth aspect, or the seventh possible implementation manner of the fifth aspect, in an eighth possible implementation manner of the fifth aspect, the communications device is a base station or a user terminal.

A sixth aspect of the present embodiments provides a communications device, including: a generation unit, configured to generate codebook configuration information; and a sending unit, configured to send the codebook configuration information to a first communications device, where the codebook configuration information is used to indicate Q codebooks and Q power factors allocated to the first communications device, and the Q codebooks and the Q power factors are in a one-to-one correspondence.

With reference to the sixth aspect, in a first possible implementation manner of the sixth aspect, the Q codebooks are SCMA codebooks, where a codeword in the Q codebooks is a complex number vector.

With reference to the sixth aspect or the first possible implementation manner of the sixth aspect, in a second possible implementation manner of the sixth aspect, the Q power factors are different from each other or some of the power factors are identical.

With reference to the sixth aspect, the first possible implementation manner of the sixth aspect, or the second possible implementation manner of the sixth aspect, in a third possible implementation manner of the sixth aspect, the communications device further includes: an adjustment unit, configured to perform power adjustment on the Q codebooks by using the Q power factors, so as to obtain power-adjusted Q codebooks; a receiving unit, configured to obtain a received signal on a resource block; and a decoding unit, configured to perform decoding processing on the received signal by using F codebooks, where the F codebooks are all codebooks used on the resource block, F is an integer greater than 1, and the F codebooks include the power-adjusted Q codewords.

With reference to the third possible implementation manner of the sixth aspect, in a fourth possible implementation manner of the sixth aspect, F is equal to Q.

With reference to the third possible implementation manner of the sixth aspect or the fourth possible implementation manner of the sixth aspect, in a fifth possible implementation manner of the sixth aspect, the adjustment unit is specifically configured to perform power adjustment on the Q codebooks by using the Q power factors according to a power adjustment formula:

$$\bar{C}_k = \alpha_k * C_k,$$

so as to obtain the power-adjusted Q codewords, where $C_k$ in the power adjustment formula represents a codebook k in the Q codebooks, $\alpha_k$ in the power adjustment formula represents a power factor corresponding to the codebook k, and $\bar{C}_k$ in the power adjustment formula represents a power-adjusted codebook obtained by performing power adjustment on the codebook k by using $\alpha_k$.

With reference to the third possible implementation manner of the sixth aspect, the fourth possible implementation manner of the sixth aspect, or the fifth possible implementation manner of the sixth aspect, in a sixth possible implementation manner of the sixth aspect, the decoding unit is specifically configured to group the F codebooks into G codebook groups, and separately decode the received signal by using the G codebook groups, where each codebook group of the G codebook groups includes at least one codebook, and G is an integer greater than 1.

With reference to the sixth possible implementation manner of the sixth aspect, in a seventh possible implementation manner of the sixth aspect, the received signal obtained on the resource block is a received signal $S_i$, and in the aspect of separately decoding the received signal by using the G codebook groups, the decoding unit is specifically configured to: if i is less than G, decode the received signal $S_i$ by using the $i^{th}$ codebook group of the G codebook groups, so as to obtain a bit sequence $D_i$, perform interference cancellation processing on the received signal $S_i$ by using the bit sequence $D_i$, so as to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the seventh possible implementation manner of the sixth aspect, in an eighth possible implementation manner of the sixth aspect, in the aspect of performing interference cancellation processing on the received signal $S_i$ by using the bit sequence $D_i$, so as to obtain a received signal $S_{i+1}$, the decoding unit is specifically configured to: map the bit sequence $D_i$ to $m_i$ codewords in the $i^{th}$ codebook group; obtain a modulation symbol $X_i$ based on the $m_i$ codewords; multiply the modulation symbol $X_i$ and a channel gain corresponding to the $i^{th}$ codebook group to obtain a product $Z_i$; and subtract the product $Z_i$ from the received signal $S_i$ so as to obtain the received signal $S_{i+1}$.

With reference to the seventh possible implementation manner of the sixth aspect or the eighth possible implementation manner of the sixth aspect, in a ninth possible implementation manner of the sixth aspect, the bit sequence $D_i$ is a bit sequence whose likelihood value is the largest among $N_i$ bit sequences that are obtained by decoding the received signal $S_i$ by using the $i^{th}$ codebook group of the G codebook groups.

With reference to the sixth possible implementation manner of the sixth aspect, in a tenth possible implementation manner of the sixth aspect, the received signal obtained on the resource block is a received signal $S_i$, and in the aspect of separately decoding the received signal by using the G codebook groups, the decoding unit is specifically configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the sixth possible implementation manner of the sixth aspect, in an eleventh possible implementation manner of the sixth aspect, the received signal obtained on the M resource blocks is a received signal $S_i$, and in the aspect of separately decoding the received signal by using the G codebook groups, the decoding unit is specifically configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_j$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, perform interference cancellation processing on the received signal $S_i$ by using the bit sequence $D_i$, so as to obtain a received signal $S_{i+1}$, and assign i+1 to i; or if a cyclic redundancy check on the bit sequence $D_i$ fails, obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the sixth possible implementation manner of the sixth aspect, the seventh possible implementation manner of the sixth aspect, the eighth possible implementation manner of the sixth aspect, the ninth possible implementation manner of the sixth aspect, the tenth possible implementation manner of the sixth aspect, or the eleventh possible implementation manner of the sixth aspect, in a twelfth possible implementation manner of the sixth aspect, average power corresponding to the $i^{th}$ codebook group of the G codebook groups is greater than average power corresponding to the $(i+1)^{th}$ codebook group of the G codebook groups.

With reference to any one of the sixth aspect, or the first possible implementation manner to the twelfth possible implementation manner of the sixth aspect, in a thirteenth possible implementation manner of the sixth aspect, the first communications device is a base station, and the communications device is a user terminal; or the communications device is a base station, and the first communications device is a user terminal.

A seventh aspect of the present embodiments provides a communications device, which may include: a processor, a memory, and a transceiver that are connected by using a bus, where the processor is configured to: perform power adjustment on Q codebooks by using Q power factors, so as to obtain power-adjusted Q codebooks, where Q is a positive integer, and the Q power factors and the Q codebooks are in a one-to-one correspondence; map Q to-be-transmitted bit sequences to Q codewords in the power-adjusted Q codebooks, where the Q bit sequences and the Q codewords are in a one-to-one correspondence; and obtain a modulation symbol based on the Q codewords; and the transceiver is configured to send the modulation symbol on a resource block.

With reference to the seventh aspect, in a first possible implementation manner of the seventh aspect, the processor is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

With reference to the seventh aspect or the first possible implementation manner of the seventh aspect, in a second possible implementation manner of the seventh aspect, the Q power factors are selected from a candidate power factor set that includes M candidate power factors.

With reference to the seventh aspect or the first possible implementation manner of the seventh aspect, in a third possible implementation manner of the seventh aspect, a power factor i in the Q power factors and a codebook j in the Q codebooks are in a one-to-one correspondence, where a value of the power factor i is determined based on a code rate of the codebook j and/or a modulation order of the codebook j.

With reference to the seventh aspect, the first possible implementation manner of the seventh aspect, the second possible implementation manner of the seventh aspect, or the third possible implementation manner of the seventh aspect, in a fourth possible implementation manner of the seventh aspect, each bit sequence of the Q bit sequences is captured from a different data stream of Q data streams.

With reference to the seventh aspect, the first possible implementation manner of the seventh aspect, the second possible implementation manner of the seventh aspect, the third possible implementation manner of the seventh aspect, or the fourth possible implementation manner of the seventh aspect, in a fifth possible implementation manner of the seventh aspect, the Q codebooks are SCMA codebooks, where a codeword in the Q codebooks is a complex number vector.

With reference to the seventh aspect, the first possible implementation manner of the seventh aspect, the second possible implementation manner of the seventh aspect, the third possible implementation manner of the seventh aspect, the fourth possible implementation manner of the seventh aspect, or the fifth possible implementation manner of the seventh aspect, in a sixth possible implementation manner of the seventh aspect, the Q power factors are different from each other or some of the power factors are identical.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, or the sixth possible implementation manner of the seventh aspect, in a seventh possible implementation manner of the seventh aspect, the transceiver is further configured to: before the processor performs power adjustment on Q codebooks by using Q power factors, so as to obtain power-adjusted Q codebooks, receive codebook configuration information, where the codebook configuration information is used to indicate the Q codebooks and the Q power factors allocated to the communications device.

With reference to the seventh aspect, the first possible implementation manner of the seventh aspect, the second possible implementation manner of the seventh aspect, the third possible implementation manner of the seventh aspect, the fourth possible implementation manner of the seventh aspect, the fifth possible implementation manner of the seventh aspect, the sixth possible implementation manner of the seventh aspect, or the seventh possible implementation manner of the seventh aspect, in an eighth possible implementation manner of the seventh aspect, the communications device is a base station or a user terminal.

An eighth aspect of the present embodiments provides a communications device, including: a processor, a memory, and a transceiver that are connected by using a bus, where the processor is configured to map Q to-be-transmitted bit sequences to Q codewords in Q codebooks, where Q is a positive integer, and the Q bit sequences and the Q codewords are in a one-to-one correspondence; perform power adjustment on the Q codewords by using Q power factors, so as to obtain power-adjusted Q codewords, where the Q power factors and the Q codebooks to which the Q codewords belong are in a one-to-one correspondence; and obtain a modulation symbol based on the power-adjusted Q codewords; and the transceiver is configured to send the modulation symbol on a resource block.

With reference to the eighth aspect, in a first possible implementation manner of the eighth aspect, the processor is specifically configured to perform power adjustment on the Q codewords by using the Q power factors according to a power adjustment formula:

$$\overline{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\overline{x}_k(g)$ in the power adjustment formula represents a power-adjusted codeword obtained by performing power adjustment on $x_k(g)$ by using $\alpha_k$.

With reference to the eighth aspect or the first possible implementation manner of the eighth aspect, in a second possible implementation manner of the eighth aspect, the Q power factors are selected from a candidate power factor set that includes M candidate power factors.

With reference to the eighth aspect or the first possible implementation manner of the eighth aspect, in a third possible implementation manner of the eighth aspect, a power factor i in the Q power factors and a codebook j in the Q codebooks are in a one-to-one correspondence, where a value of the power factor i is determined based on a code rate of the codebook j and/or a modulation order of the codebook j.

With reference to the eighth aspect, the first possible implementation manner of the eighth aspect, the second possible implementation manner of the eighth aspect, or the third possible implementation manner of the eighth aspect, in a fourth possible implementation manner of the eighth aspect, each bit sequence of the Q bit sequences is captured from a different data stream of Q data streams.

With reference to the eighth aspect, the first possible implementation manner of the eighth aspect, the second possible implementation manner of the eighth aspect, the third possible implementation manner of the eighth aspect, or the fourth possible implementation manner of the eighth aspect, in a fifth possible implementation manner of the eighth aspect, the Q codebooks are SCMA codebooks, where a codeword in the Q codebooks is a complex number vector.

With reference to the eighth aspect, the first possible implementation manner of the eighth aspect, the second possible implementation manner of the eighth aspect, the third possible implementation manner of the eighth aspect, the fourth possible implementation manner of the eighth aspect, or the fifth possible implementation manner of the eighth aspect, in a sixth possible implementation manner of the eighth aspect, the Q power factors are different from each other or some of the power factors are identical.

With reference to the eighth aspect, the first possible implementation manner of the eighth aspect, the second possible implementation manner of the eighth aspect, the third possible implementation manner of the eighth aspect, the fourth possible implementation manner of the eighth aspect, the fifth possible implementation manner of the eighth aspect, or the sixth possible implementation manner of the eighth aspect, in a seventh possible implementation manner of the eighth aspect, the transceiver is further configured to: before the processor maps Q to-be-transmitted bit sequences to Q codewords in Q codebooks, receive codebook configuration information, where the codebook configuration information is used to indicate the Q codebooks and the Q power factors allocated to the communications device.

With reference to the eighth aspect, the first possible implementation manner of the eighth aspect, the second possible implementation manner of the eighth aspect, the third possible implementation manner of the eighth aspect, the fourth possible implementation manner of the eighth aspect, the fifth possible implementation manner of the eighth aspect, the sixth possible implementation manner of the eighth aspect, or the seventh possible implementation manner of the eighth aspect, in an eighth possible implementation manner of the eighth aspect, the communications device is a base station or a user terminal.

A ninth aspect of the present embodiments provides a communications device, including: a processor, a memory, and a transceiver that are connected by using a bus, where the processor is configured to generate codebook configuration information; and the transceiver is configured to send the codebook configuration information to a first communications device, where the codebook configuration information is used to indicate Q codebooks and Q power factors allocated to the first communications device, and the Q codebooks and the Q power factors are in a one-to-one correspondence.

With reference to the ninth aspect, in a first possible implementation manner of the ninth aspect, the Q codebooks are SCMA codebooks, where a codeword in the Q codebooks is a complex number vector.

With reference to the ninth aspect or the first possible implementation manner of the ninth aspect, in a second possible implementation manner of the ninth aspect, the Q power factors are different from each other or some of the power factors are identical.

With reference to the ninth aspect, the first possible implementation manner of the ninth aspect, or the second possible implementation manner of the ninth aspect, in a third possible implementation manner of the ninth aspect, the processor is further configured to perform power adjustment on the Q codebooks by using the Q power factors, so as to obtain power-adjusted Q codebooks; obtain a received signal on a resource block by using the transceiver; and perform decoding processing on the received signal by using F codebooks, where the F codebooks are all codebooks used on the resource block, F is an integer greater than 1, and the F codebooks include the power-adjusted Q codewords.

With reference to the third possible implementation manner of the ninth aspect, in a fourth possible implementation manner of the ninth aspect, F is equal to Q.

With reference to the third possible implementation manner of the ninth aspect or the fourth possible implementation manner of the ninth aspect, in a fifth possible implementation manner of the ninth aspect, the processor is specifically configured to perform power adjustment on the Q codebooks by using the Q power factors according to a power adjustment formula:

$$\overline{C}_k = \alpha_k \cdot C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

With reference to the third possible implementation manner of the ninth aspect, the fourth possible implementation manner of the ninth aspect, or the fifth possible implementation manner of the ninth aspect, in a sixth possible implementation manner of the ninth aspect, the processor is configured to group the F codebooks into G codebook groups, and separately decode the received signal by using the G codebook groups, where each codebook group of the G codebook groups includes at least one codebook, and G is an integer greater than 1.

With reference to the sixth possible implementation manner of the ninth aspect, in a seventh possible implementation manner of the ninth aspect, the received signal obtained on the resource block is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain a bit sequence $D_i$, perform interference cancellation processing on the received signal $S_i$ by using the bit sequence $D_i$, so as to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the seventh possible implementation manner of the ninth aspect, in an eighth possible implementation manner of the ninth aspect, in the aspect of performing interference cancellation processing on the received signal $S_i$ by using the bit sequence $D_i$, so as to obtain a received signal $S_{i+1}$, the processor is configured to: map the bit sequence $D_i$ to $m_i$ codewords in the $i^{th}$ codebook group; obtain a modulation symbol $X_i$ based on the $m_i$ codewords; multiply the modulation symbol $X_i$ and a channel gain corresponding to the $i^{th}$ codebook group to obtain a product $Z_i$; and subtract the product $Z_i$ from the received signal $S_i$ so as to obtain the received signal $S_{i+1}$.

With reference to the seventh possible implementation manner of the ninth aspect or the eighth possible implementation manner of the ninth aspect, in a ninth possible implementation manner of the ninth aspect, the bit sequence $D_i$ is a bit sequence whose likelihood value is the largest among $N_i$ bit sequences that are obtained by decoding the received signal $S_i$ by using the $i^{th}$ codebook group of the G codebook groups.

With reference to the sixth possible implementation manner of the ninth aspect, in a tenth possible implementation manner of the ninth aspect, the received signal obtained on the resource block is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the sixth possible implementation manner of the ninth aspect, in an eleventh possible implementation manner of the ninth aspect, the received signal obtained on the M resource blocks is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_j$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, perform interference cancellation processing on the received signal $S_i$ by using the bit sequence $D_i$, so as to obtain a received signal $S_{i+1}$, and assign i+1 to i; or if a cyclic redundancy check on the bit sequence $D_i$ fails, obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

With reference to the sixth possible implementation manner of the ninth aspect, the seventh possible implementation manner of the ninth aspect, the eighth possible implementation manner of the ninth aspect, the ninth possible implementation manner of the ninth aspect, the tenth possible implementation manner of the ninth aspect, or the eleventh possible implementation manner of the ninth aspect, in a twelfth possible implementation manner of the ninth aspect, average power corresponding to the $i^{th}$ codebook group of the G codebook groups is greater than average power corresponding to the (i+1) codebook group of the G codebook groups.

With reference to any one of the ninth aspect, or the first possible implementation manner to the twelfth possible implementation manner of the ninth aspect, in a thirteenth possible implementation manner of the ninth aspect, the first communications device is a base station, and the communications device is a user terminal; or the communications device is a base station, and the first communications device is a user terminal.

It may be learned that, in some technical solutions of the embodiments of the present invention, a first communications device performs power adjustment on Q codebooks by using Q power factors, so as to obtain power-adjusted Q codebooks, and the first communications device maps Q to-be-transmitted bit sequences to Q codewords in the power-adjusted Q codebooks. In this way, powers of the Q codewords used to represent the Q bit sequences may be different, and it is found from tests and practice that, using Q codewords of different powers to represent the Q bit sequences at a transmitter helps improve signal decoding quality at a receiver, and the Q codewords of different power helps design a more optimized decoding algorithm with lower complexity, and further helps reduce complexity of a signal decoding operation at the receiver in a communications system.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 4-*a* is a schematic flowchart of another data communication method according to an embodiment of the present invention;

FIG. 4-*b* is a schematic diagram of an architecture for bit processing according to an embodiment of the present invention;

FIG. 4-*c* is a schematic diagram of another architecture for bit processing according to an embodiment of the present invention;

FIG. 4-*d* is a schematic diagram of another architecture for bit processing according to an embodiment of the present invention;

FIG. 4-*e* is a schematic diagram of power-adjusted codebooks according to an embodiment of the present invention;

FIG. 5-*a* is a schematic flowchart of a data communication method according to an embodiment of the present invention;

FIG. 5-*b* is a schematic diagram of another architecture for bit processing according to an embodiment of the present invention;

FIG. 5-*c* is a schematic diagram of another architecture for bit processing according to an embodiment of the present invention;

FIG. 5-*d* is a schematic diagram of another architecture for bit processing according to an embodiment of the present invention;

DETAILED DESCRIPTION OF ILLUSTRATIVE EMBODIMENTS

The embodiments of the present invention provide a data communication method, a related device, and a communications system, so as to reduce complexity of a signal decoding operation at a receiver in the communications system and improve signal decoding quality at the receiver.

To make the embodiment objectives, features, and advantages of the present invention clearer and more comprehensible, the following describes the technical solutions in the embodiments of the present embodiments with reference to the accompanying drawings in the embodiments of the present invention. Apparently, the embodiments described are merely some rather than all of the embodiments of the present invention. All other embodiments obtained by persons of ordinary skill in the art based on the embodiments of the present invention without creative efforts shall fall within the protection scope of the present embodiments.

In the specification, claims, and accompanying drawings of the present embodiments, the terms "first," "second," "third," "fourth," and so on are intended to distinguish between different objects but do not indicate a particular order. In addition, the terms "including," "including," or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

In an embodiment of the data communication method in the present embodiments, a data communication method may include: performing, by a first communications device, power adjustment on Q codebooks by using Q power factors, so as to obtain power-adjusted Q codebooks, where Q is a positive integer, and the Q power factors and the Q codebooks are in a one-to-one correspondence; mapping, by the first communications device, Q to-be-transmitted bit sequences to Q codewords in the power-adjusted Q codebooks, where the Q bit sequences and the Q codewords are in a one-to-one correspondence; obtaining, by the first communications device, a modulation symbol based on the Q codewords; and sending, by the first communications device, the modulation symbol on a resource block.

Figure 1:
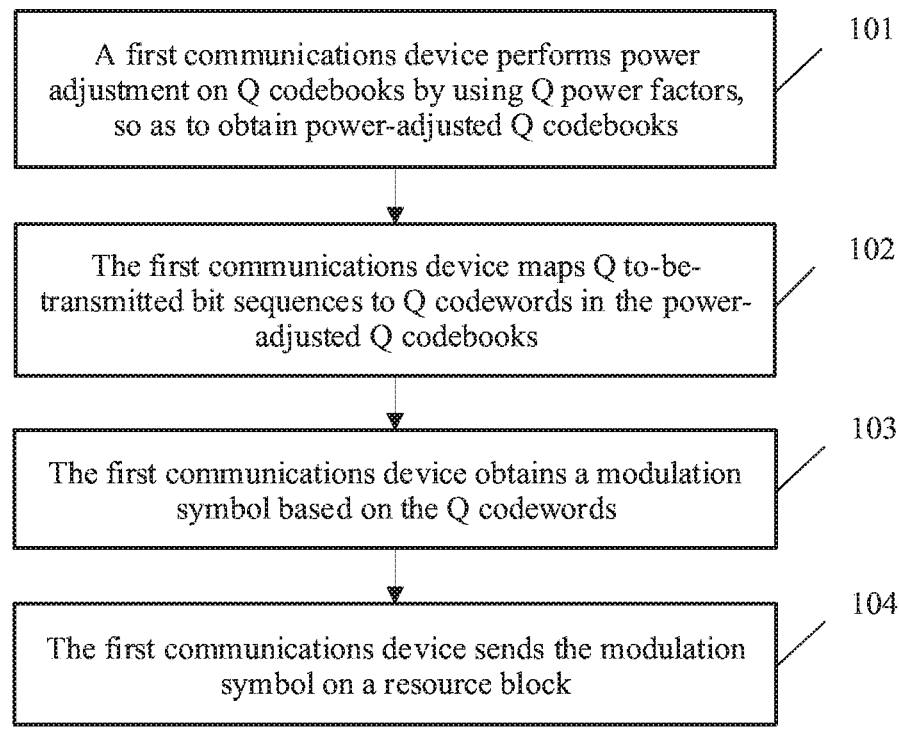
FIG. 1 is a schematic flowchart of a data communication method according to an embodiment of the present invention.

Referring to FIG. 1, FIG. 1 is a schematic flowchart of a data communication method according to an embodiment of the present invention. As shown in an example in FIG. 1, a data communication method provided in an embodiment of the present invention may include the following steps.

101. A first communications device performs power adjustment on Q codebooks by using Q power factors, so as to obtain power-adjusted Q codebooks, where Q is a positive integer, and the Q power factors and the Q codebooks are in a one-to-one correspondence.

For example, Q may be equal to 1, 2, 3, 4, 6, 8, 15, or another positive integer.

Optionally, the first communications device may be a base station, a terminal, or another type of device.

102. The first communications device maps Q to-be-transmitted bit sequences to Q codewords in the power-adjusted Q codebooks, where the Q bit sequences and the Q codewords are in a one-to-one correspondence.

Different codewords in a codebook may represent bit sequences of different values. Therefore, the power-adjusted Q codewords may be searched for the Q codewords that are in a one-to-one correspondence with the Q to-be-transmitted bit sequences, so that the Q to-be-transmitted bit sequences are mapped to the Q codewords in the power-adjusted Q codebooks.

Lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. Particularly, at least two bit sequences in the Q bit sequences may be captured from a same data stream, or a bit sequence of the Q bit sequences may be captured from at least two data streams.

The Q bit sequences may be bit sequences obtained after channel encoding.

Optionally, the Q power factors are different from each other or some of the power factors are identical.

Optionally, the Q power factors may be selected from a candidate power factor set that includes M candidate power factors. For example, the Q power factors may be selected, according to a need, from the candidate power factor set that includes the M candidate power factors. Because some of the power factors may be identical, M may be greater than, or equal to, or less than Q. Further, optionally, a power factor i in the Q power factors and a codebook j in the Q codebooks are in a one-to-one correspondence, where a value of the power factor i is determined based on a parameter, such as a code rate of the codebook j and/or a modulation order of the codebook j. The power factor i may be any power factor in the Q power factors.

Optionally, the Q codebooks are SCMA codebooks or codebooks of another type. A codeword in the Q codebooks may be a complex number vector or a codeword in another form.

103. The first communications device obtains a modulation symbol based on the Q codewords.

Specifically, for example, the first communications device may perform a summation operation on the Q codewords to obtain the modulation symbol.

104. The first communications device sends the modulation symbol on a resource block.

It may be learned that, in the technical solutions of this embodiment, a first communications device performs power adjustment on Q codebooks by using Q power factors, so as to obtain power-adjusted Q codebooks, and maps Q to-be-transmitted bit sequences to Q codewords in the power-adjusted Q codebooks. In this way, powers of the Q codewords used to represent the Q bit sequences may be different, and it is found from tests and practice that, using Q codewords of different powers to represent the Q bit sequences at a transmitter helps improve signal decoding quality at a receiver, and the Q codewords of different powers helps design a more optimized decoding algorithm with lower complexity, and further helps greatly reduce complexity of a signal decoding operation at the receiver in a communications system.

Optionally, in some possible implementation manners of the present embodiments, the performing power adjustment on Q codebooks by using Q power factors, so as to obtain power-adjusted Q codebooks may include: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$. The codebook k may be any codebook in the Q codebooks.

Optionally, in some possible implementation manners of the present embodiments, the Q codebooks may be pre-stored in the first communications device. Certainly, the Q codebooks may be allocated by a second communications device to the first communications device. For example, the second communications device may instruct the first communications device to select and use the Q codebooks in F codebooks pre-stored in the first communications device, or the second communications device delivers, to the first communications device, the Q codebooks allocated to the first communications device.

Optionally, in some possible implementation manners of the present embodiments, the Q power factors may be pre-stored in the first communications device. Certainly, the Q power factors may be allocated by the second communications device to the first communications device. For example, the second communications device may instruct the first communications device to select and use the Q power factors in M power factors pre-stored in the first communications device, or the second communications device delivers, to the first communications device, the Q power factors allocated to the first communications device.

Optionally, the first communications device is a base station, and the second communications device is a user terminal; or the second communications device is a base station, and the first communications device is a user terminal. Certainly, the first communications device and/or the second communications device may be another type of device.

For example, before the performing power adjustment on Q codebooks by using Q power factors, so as to obtain power-adjusted Q codebooks, the data communication method may further include: receiving, by the first communications device, codebook configuration information, where the codebook configuration information is used to indicate the Q codebooks and the Q power factors allocated to the first communications device. Specifically, for example, the first communications device receives a control message that carries the codebook configuration information, and the codebook configuration information includes first indication information and second indication information. The first indication information is used to indicate the Q codebooks allocated to the first communications device, and the first indication information may be the Q codebooks, or may be other information that can be used to indicate the Q codebooks. The second indication information is used to indicate the Q power factors allocated to the first communications device, and the second indication information may be the Q power factors, or may be other information that can be used to indicate the Q power factors.

In another embodiment of the data communication method in the present embodiments, another data communication method may include: mapping, by a first communications device, Q to-be-transmitted bit sequences to Q codewords in Q codebooks, where Q is a positive integer, and the Q bit sequences and the Q codewords are in a one-to-one correspondence; performing, by the first communications device, power adjustment on the Q codewords by using Q power factors, so as to obtain power-adjusted Q codewords, where the Q power factors and the Q codebooks to which the Q codewords belong are in a one-to-one correspondence; obtaining, by the first communications device, a modulation symbol based on the power-adjusted Q codewords; and sending, by the first communications device, the modulation symbol on a resource block.

Figure 2:
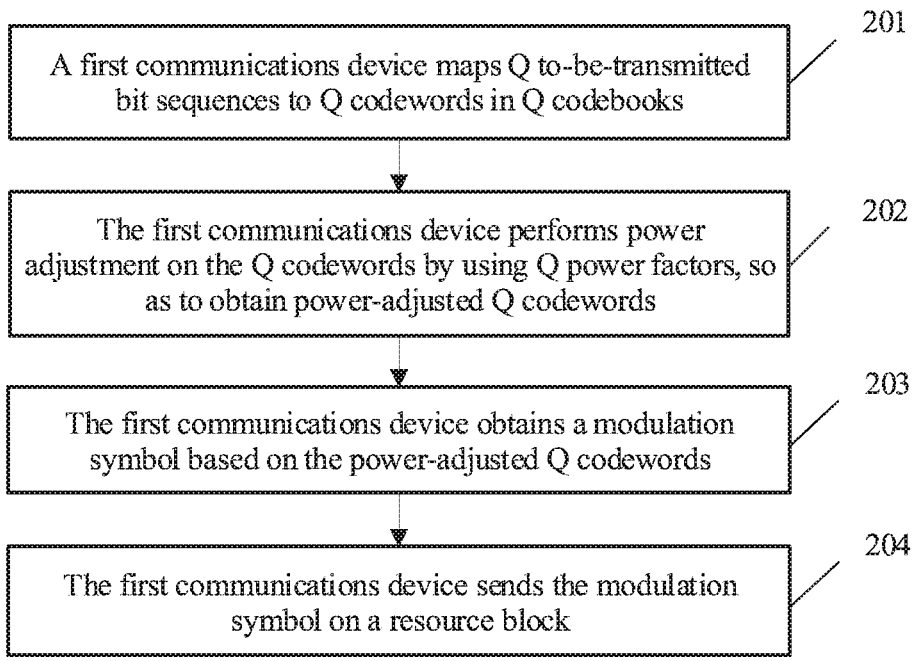
FIG. 2 is a schematic flowchart of another data communication method according to an embodiment of the present invention.

Referring to FIG. 2, FIG. 2 is a schematic flowchart of another data communication method according to another embodiment of the present invention. As shown in an example in FIG. 2, another data communication method provided in another embodiment of the present invention may include the following steps.

201. A first communications device maps Q to-be-transmitted bit sequences to Q codewords in Q codebooks, where Q is a positive integer, and the Q bit sequences and the Q codewords are in a one-to-one correspondence.

For example, Q may be equal to 1, 2, 3, 4, 6, 8, 15, or another positive integer.

Optionally, the first communications device may be a base station, a terminal, or another type of device.

The Q bit sequences may be bit sequences obtained after channel encoding.

Different codewords in a codebook may represent bit sequences of different values. Therefore, the power-adjusted Q codebooks may be searched for the Q codewords that are in a one-to-one correspondence with the Q to-be-transmitted bit sequences, so that the Q to-be-transmitted bit sequences are mapped to the Q codewords in the power-adjusted Q codebooks.

Lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. Particularly, at least two bit sequences in the Q bit sequences may be captured from a same data stream, or a bit sequence of the Q bit sequences may be captured from at least two data streams.

202. The first communications device performs power adjustment on the Q codewords by using Q power factors, so as to obtain power-adjusted Q codewords, where the Q power factors and the Q codebooks to which the Q codewords belong are in a one-to-one correspondence.

Optionally, the Q power factors are different from each other or some of the power factors are identical.

Optionally, the Q power factors may be selected from a candidate power factor set that includes M candidate power factors. For example, the Q power factors may be selected, according to a need, from the candidate power factor set that includes the M candidate power factors. Because some of the Q power factors may be identical, M may be greater than, or equal to, or less than Q. Further, optionally, a power factor i in the Q power factors and a codebook j in the Q codebooks are in a one-to-one correspondence, where a value of the power factor i is determined based on a parameter, such as a code rate of the codebook j and/or a modulation order of the codebook j. For example, a higher code rate of the codebook j indicates that a value of the power factor i may be greater or smaller. For example, a higher modulation order of the codebook j indicates that a value of the power factor i may be greater or smaller. Certainly, the value of the power factor may be determined based on another algorithm. The power factor i may be any power factor in the Q power factors.

Optionally, the Q codebooks are SCMA codebooks or codebooks of another type. A codeword in the Q codebooks may be a complex number vector or a codeword in another form.

203. The first communications device obtains a modulation symbol based on the power-adjusted Q codewords.

Specifically, for example, the first communications device may perform a summation operation on the power-adjusted Q codewords to obtain the modulation symbol.

204. The first communications device sends the modulation symbol on a resource block.

It may be learned that, in the solutions of this embodiment, after mapping Q to-be-transmitted bit sequences to Q codewords in Q codebooks, a first communications device performs power adjustment on the Q codewords by using Q power factors, so as to obtain power-adjusted Q codewords, obtains a modulation symbol based on the power-adjusted Q codewords, and then sends the modulation symbol. Power adjustment is performed on the Q codewords used to indicate the Q bit sequences, so that powers of the Q codewords used to represent the Q bit sequences may be different. It is found from tests and practice that, using Q codewords of different powers to represent the Q bit sequences at a transmitter helps improve signal decoding quality at a receiver, and the Q codewords of different power helps design a more optimized decoding algorithm with lower complexity, and further helps reduce complexity of a signal decoding operation at the receiver in a communications system.

Optionally, in some possible implementation manners of the present embodiments, the performing power adjustment on the Q codewords by using Q power factors, so as to obtain power-adjusted Q codewords includes: performing power adjustment on the Q codewords by using the Q power factors according to a power adjustment formula:

$$\bar{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\bar{x}_k(g)$ in the power adjustment formula represents a power-adjusted codeword obtained by performing power adjustment on $x_k(g)$ by using $\alpha_k$. The codebook k may be any codebook in the Q codebooks.

Optionally, in some possible implementation manners of the present embodiments, the Q codebooks may be pre-stored in the first communications device. Certainly, the Q codebooks may be allocated by a second communications device to the first communications device. For example, the second communications device may instruct the first communications device to select and use the Q codebooks in F codebooks pre-stored in the first communications device, or the second communications device delivers, to the first communications device, the Q codebooks allocated to the first communications device.

Optionally, in some possible implementation manners of the present embodiments, the Q power factors may be pre-stored in the first communications device. Certainly, the Q power factors may be allocated by the second communications device to the first communications device. For example, the second communications device may instruct the first communications device to select and use the Q power factors in M power factors pre-stored in the first communications device, or the second communications device delivers, to the first communications device, the Q power factors allocated to the first communications device.

Optionally, the first communications device is a base station, and the second communications device is a user terminal; or the second communications device is a base station, and the first communications device is a user terminal. Certainly, the first communications device and/or the second communications device may be another type of device.

For example, before the performing power adjustment on Q codebooks by using Q power factors, so as to obtain power-adjusted Q codebooks, the data communication method may further include: receiving, by the first communications device, codebook configuration information, where the codebook configuration information is used to indicate the Q codebooks and the Q power factors allocated to the first communications device. Specifically, for example, the first communications device receives a control message that carries the codebook configuration information, and the codebook configuration information includes first indication information and second indication information. The first indication information is used to indicate the Q codebooks allocated to the first communications device, and the first indication information may be the Q codebooks, or may be other information that can be used to indicate the Q codebooks. The second indication information is used to indicate the Q power factors allocated to the first communications device, and the second indication information may be the Q power factors, or may be other information that can be used to indicate the Q power factors.

In another embodiment of the data communication method in the present embodiments, another data communication method may include: generating, by a second communications device, codebook configuration information; and sending, by the second communications device, the codebook configuration information to a first communications device, where the codebook configuration information is used to indicate Q codebooks and Q power factors allocated to the first communications device, and the Q codebooks and the Q power factors are in a one-to-one correspondence.

Figure 3:
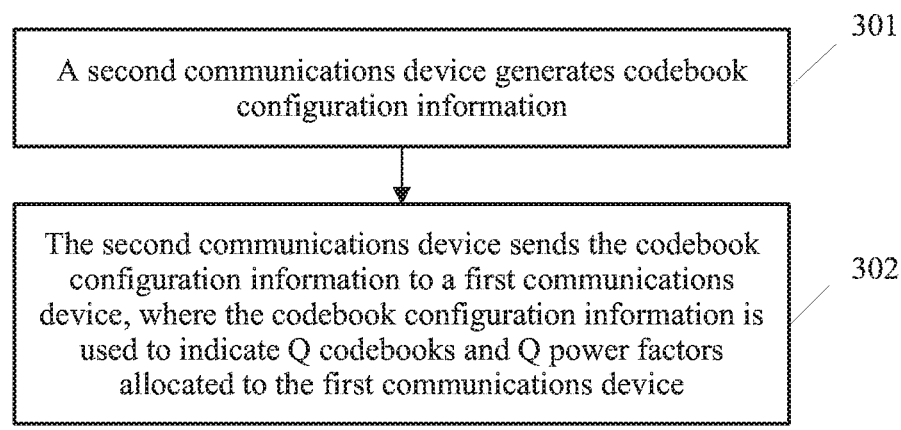
FIG. 3 is a schematic flowchart of another data communication method according to an embodiment of the present invention.

Referring to FIG. 3, FIG. 3 is a schematic flowchart of another data communication method according to another embodiment of the present invention. As shown in an example in FIG. 3, another data communication method provided in another embodiment of the present invention may include the following steps.

301. A second communications device generates codebook configuration information.

302. The second communications device sends the codebook configuration information to a first communications device.

The codebook configuration information is used to indicate Q codebooks and Q power factors allocated to the first communications device.

The Q codebooks and the Q power factors are in a one-to-one correspondence.

Optionally, the Q power factors are different from each other or some of the power factors are identical.

Optionally, the first communications device is a base station, and the second communications device is a user terminal; or the second communications device is a base station, and the first communications device is a user terminal. Certainly, the first communications device and/or the second communications device may be another type of device.

For example, Q may be equal to 1, 2, 3, 4, 6, 8, 15, or another positive integer.

Optionally, the Q codebooks are SCMA codebooks or codebooks of another type. A codeword in the Q codebooks may be a complex number vector or a codeword in another form.

Optionally, the Q power factors may be selected from a candidate power factor set that includes M candidate power factors. For example, the Q power factors may be selected, according to a need, from the candidate power factor set that includes the M candidate power factors. Because some of the power factors may be identical, M may be greater than, or equal to, or less than Q. Further, optionally, a power factor i in the Q power factors and a codebook j in the Q codebooks are in a one-to-one correspondence, where a value of the power factor i is determined based on a parameter, such as a code rate of the codebook j and/or a modulation order of the codebook j. For example, a higher code rate of the codebook j indicates that a value of the power factor i may be greater or smaller. For example, a higher modulation order of the codebook j indicates that a value of the power factor i may be greater or smaller. Certainly, the value of the power factor may be determined based on another algorithm. The power factor i may be any power factor in the Q power factors.

It may be learned that, in the solutions of this embodiment, a second communications device sends codebook configuration information to a first communications device, where the codebook configuration information is used to indicate Q codebooks and Q power factors allocated to the first communications device, so that the first communications device performs power adjustment on the Q codebooks or codewords in the Q codebooks by using the Q power factors. When power adjustment is performed on Q codewords used to indicate Q bit sequences, powers of the Q codewords used to represent the Q bit sequences may be different. It is found from tests and practice that, using Q codewords used of different powers to represent the Q bit sequences at a transmitter (the first communications device) helps improve signal decoding quality at a receiver, and the Q codewords of different powers helps design a more optimized decoding algorithm with lower complexity, and further helps reduce complexity of a signal decoding operation at the receiver in a communications system.

Optionally, in some possible implementation manners of the present embodiments, the sending, by the second communications device, the codebook configuration information to a first communications device may include: sending, to the first communications device by the second communications device, a control message that carries the codebook configuration information, where the codebook configuration information includes first indication information and second indication information. The first indication information is used to indicate the Q codebooks allocated to the first communications device, and the first indication information may be the Q codebooks, or may be other information that can be used to indicate the Q codebooks. The second indication information is used to indicate the Q power factors allocated to the first communications device, and the second indication information may be the Q power factors, or may be other information that can be used to indicate the Q power factors.

Correspondingly, the first communications device may receive the codebook configuration information from the second communications device, where the codebook configuration information is used to indicate the Q codebooks and the Q power factors allocated to the first communications device. Further, alternatively, the first communications device may map Q to-be-transmitted bit sequences to Q codewords in Q codebooks, where Q is a positive integer, and the Q bit sequences and the Q codewords are in a one-to-one correspondence; the first communications device performs power adjustment on the Q codewords by using Q power factors, so as to obtain power-adjusted Q codewords, where the Q power factors and the Q codebooks to which the Q codewords belong are in a one-to-one correspondence; the first communications device obtains a modulation symbol based on the power-adjusted Q codewords; and the first communications device sends the modulation symbol on a resource block. Alternatively, further, the first communications device performs power adjustment on Q codebooks by using Q power factors, so as to obtain power-adjusted Q codebooks, where Q is a positive integer, and the Q power factors and the Q codebooks are in a one-to-one correspondence; the first communications device maps Q to-be-transmitted bit sequences to Q codewords in the power-adjusted Q codebooks, where the Q bit sequences and the Q codewords are in a one-to-one correspondence; the first communications device obtains a modulation symbol based on the Q codewords; and the first communications device sends the modulation symbol on a resource block.

Lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. Particularly, at least two bit sequences in the Q bit sequences may be captured from a same data stream, or a bit sequence of the Q bit sequences may be captured from at least two data streams.

Optionally, in some possible implementation manners of the present embodiments, the performing, by the first communications device, power adjustment on Q codebooks by using Q power factors, so as to obtain power-adjusted Q codebooks may include: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$. The codebook k may be any codebook in the Q codebooks.

Optionally, in some possible implementation manners of the present embodiments, the performing power adjustment on the Q codewords by using Q power factors, so as to obtain power-adjusted Q codewords includes: performing power adjustment on the Q codewords by using the Q power factors according to a power adjustment formula:

$$\overline{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\overline{x}_k(g)$ in the power adjustment formula represents a power-adjusted codeword obtained by performing power adjustment on $x_k(g)$ by using $\alpha_k$. The codebook k may be any codebook in the Q codebooks.

Optionally, in some possible implementation manners of the present invention, the data communication method may further include: performing, by the second communications device, power adjustment on the Q codebooks by using the Q power factors, so as to obtain power-adjusted Q codebooks; obtaining, by the second communications device, a received signal on a resource block (for example, one or more resource blocks); and performing, by the second communications device, decoding processing on the received signal by using F codebooks, where the F codebooks are all codebooks used on the resource block, F is an integer greater than 1, and the F codebooks include the power-adjusted Q codewords.

F may be greater than or equal to Q.

Optionally, in some possible implementation manners of the present embodiments, the performing, by the second communications device, power adjustment on the Q codebooks by using the Q power factors, so as to obtain power-adjusted Q codebooks may include: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Optionally, in some possible implementation manners of the present embodiments, the performing decoding processing on the received signal by using F codebooks may include: performing decoding processing on the received signal by referring to all the F codebooks at the same time.

Optionally, in some possible implementation manners of the present embodiments, the performing decoding processing on the received signal by using F codebooks may include: grouping the F codebooks into G codebook groups, and separately decoding the received signal by using the G codebook groups, where each codebook group of the G codebook groups includes at least one codebook, and G is an integer greater than 1.

It may be learned that, in the solutions of this embodiment, after a received signal is obtained on a resource block, the received signal is separately decoded by using G codebook groups that are obtained by grouping all codebooks used on the resource block, that is, the received signal is decoded once by using one group of codebooks in the G codebook groups (that is, some possible codebooks are used). Because complexity of single decoding and a codebook quantity are in an exponential relationship, the solutions of this embodiment of the present embodiments help greatly reduce complexity of a signal decoding operation at a receiver in an SCMA system, while all possible codebooks are referred to at the same time for one time of conventional decoding. For example, it is assumed that complexity of a conventional signal decoding algorithm is represented as $P^F$, while complexity of the solutions of this embodiment of the present invention approximates to $G*P^{F/G}$, where F is a total quantity of all codebooks used on M resource blocks, and when F is relatively large, $G*P^{F/G}$ is far less than $P^F$.

The received signal may be separately decoded by using the G codebook groups in various manners.

For example, the received signal obtained on the resource block is a received signal $S_i$, and the separately decoding the received signal by using the G codebook groups includes: if i is less than G, decoding the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtaining $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtaining an average modulation symbol $X_i$ based on the $N_i$ likelihood values $L_i$ and the $N_i$ modulation symbols $X_i'$, multiplying the average modulation symbol $X_i$ and a channel gain corresponding to the $i^{th}$ codebook group to obtain a product $Z_i$, subtracting the product $Z_i$ from the received signal $S_i$ to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

For another example, the received signal obtained on the M resource blocks is a received signal $S_i$, and the separately decoding the received signal by using the G codebook groups includes: if i is less than G, decoding the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_i$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, performing interference cancellation processing on the received signal $S_i$ by using the bit sequence $D_i$, so as to obtain a received signal $S_{i+1}$, and assigning i+1 to i; or if a cyclic redundancy check on the bit sequence $D_i$ fails, obtaining $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtaining an average modulation symbol $X_i$ based on the $N_i$ likelihood values $L_i$ and the $N_i$ modulation symbols $X_i'$, multiplying the average modulation symbol $X_i$ and a channel gain corresponding to the $i^{th}$ codebook group to obtain a product $Z_i$, subtracting the product $Z_i$ from the received signal $S_i$ to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

For another example, the received signal obtained on the resource block is a received signal $S_i$, and the separately decoding the received signal by using the G codebook groups may include: if i is less than G, decoding the received signal $S_i$ by using the $i^{th}$ codebook group of the G codebook groups, so as to obtain a bit sequence $D_i$, performing interference cancellation processing on the received signal $S_i$ by using the bit sequence $D_i$, so as to obtain a received signal $S_{i+1}$, and assigning i+1 to i; or if i is equal to G, decoding the received signal $S_i$ by using the $i^{th}$ codebook group of the G codebook groups, so as to obtain a bit sequence $D_i$.

Optionally, the performing interference cancellation processing on the received signal $S_i$ by using the bit sequence $D_i$, so as to obtain a received signal $S_{i+1}$ may include: mapping the bit sequence $D_i$ to $m_i$ codewords in the $i^{th}$ codebook group; obtaining a modulation symbol $X_i$ based on the $m_i$ codewords; multiplying the modulation symbol $X_i$ and a channel gain corresponding to the $i^{th}$ codebook group to obtain a product $Z_i$; and subtracting the product $Z_i$ from the received signal $S_i$ so as to obtain the received signal $S_{i+1}$.

Optionally, the bit sequence $D_i$ is a bit sequence whose likelihood value is the largest, the second largest, or the third largest among $N_i$ bit sequences that are obtained by decoding the received signal $S_i$ by using the $i^{th}$ codebook group of the G codebook groups.

Optionally, in some possible implementation manners of the present invention, average power corresponding to the $i^{th}$ codebook group of the G codebook groups is greater than average power corresponding to the $(i+1)^{th}$ codebook group of the G codebook groups. It is found from practice that a signal is first decoded by using a codebook group with relatively large average power, and the signal is then decoded by using a codebook group with relatively high average power, which helps improve accuracy of decoding and reduce a bit error rate of decoding.

Optionally, in some possible implementation manners of the present embodiments, before the obtaining a received signal on a resource block, the method may further include: sending, to a third communications device that sends a signal on the resource block, a second control message that carries a second configuration indication, where the second configuration indication is used to indicate K2 codebooks allocated to the third communications device, and average powers of a codebook a2 and a codebook b2 in the K2 codebooks are different. The codebook a2 and the codebook b2 may be any two codebooks of the K2 codebooks. The K2 codebooks are a subset of codebooks included in the G codebook groups. It is found from practice that average powers of some of the K2 codebooks may be identical or average powers of the K2 codebooks may be different from each other, which helps improve accuracy of signal decoding and reduce a bit error rate of decoding, and also helps improve flexibility of signal decoding. Accordingly, the third communications device may use the K2 codebooks to map a to-be-transmitted bit sequence to a codeword. For example, the third communications device may be a user terminal or another communications device.

To better understand and implement the foregoing solutions of the embodiments of the present invention, the following uses some specific application scenarios as an example for description.

Referring to FIG. 4-a, FIG. 4-a is a schematic flowchart of another data communication method according to another embodiment of the present invention. As shown in an example in FIG. 4-a, another data communication method provided in another embodiment of the present invention may include the following steps.

401. A base station sends, to a first user terminal, a control message that carries a first configuration indication.

The first configuration indication is used to indicate Q codebooks allocated to the first user terminal and power factors (that is, Q power factors) corresponding to all the Q codebooks. Q is a positive integer. The Q power factors and the Q codebooks are in a one-to-one correspondence. Optionally, the Q power factors are different from each other or some of the power factors are identical. For example, power factors corresponding to a codebook a1 and a codebook b1 in the Q codebooks are different. The codebook a1 and the codebook b1 may be any two codebooks of the Q codebooks.

For example, Q may be equal to 1, 2, 3, 4, 6, 8, 15, or another positive integer.

402. The first user terminal receives, from the base station, the control message that carries the first configuration indication.

The first user terminal may perform power adjustment on the Q codebooks by using the Q power factors, so as to obtain power-adjusted Q codebooks. The first user terminal maps Q to-be-transmitted bit sequences to Q codewords in the power-adjusted Q codebooks, where the Q bit sequences and the Q codewords are in a one-to-one correspondence; the first user terminal obtains a modulation symbol based on the Q codewords; and the first user terminal sends the modulation symbol on M (M is a positive integer) resource blocks.

Optionally, in some possible implementation manners of the present invention, the performing power adjustment on the Q codebooks by using the Q power factors, so as to obtain power-adjusted Q codebooks may include: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$. The codebook k may be any codebook in the Q codebooks.

The first user terminal may obtain the modulation symbol according to a formula:

$$y(g) = \Sigma_{k=1}^{K1} x_k(g)$$

based on the Q codewords, where $x_k(g)$ in the formula represents a codeword g in the Q codewords, and y(g) represents the modulation symbol obtained based on the Q codewords.

Different codewords in a codebook may represent bit sequences of different values. Therefore, the power-adjusted Q codewords may be searched for the Q codewords that are in a one-to-one correspondence with the Q to-be-transmitted bit sequences, so that the Q to-be-transmitted bit sequences are mapped to the Q codewords in the power-adjusted Q codebooks.

Lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. A schematic diagram of a specific processing architecture in such a scenario may be shown in an example in FIG. 4-b. Particularly, at least two bit sequences in the Q bit sequences may be captured from a same data stream. A schematic diagram of a specific processing architecture in such a scenario may be shown in an example in FIG. 4-c. Alternatively, a bit sequence of the Q bit sequences may be captured from at least two data streams. A schematic diagram of a specific processing architecture in such a scenario may be shown in an example in FIG. 4-d.

403. The base station obtains a received signal on M resource blocks.

For example, one or more user terminals that include the first user terminal may send a signal on the M resource blocks. Therefore, the received signal obtained by the base station on the M resource blocks may be from the one or more user terminals that include the first user terminal.

404. The base station performs power adjustment on Q codebooks by using Q power factors, so as to obtain power-adjusted Q codebooks, where the base station groups all codebooks (F codebooks) used on the M resource blocks, to obtain G codebook groups.

Because the base station is responsible for scheduling and allocating all codebooks used on all resource blocks, the base station can learn all the codebooks used on the M resource blocks. Optionally, the F codebooks are SCMA codebooks or codebooks of another type. A codeword in the F codebooks may be a complex number vector or a codeword in another form. The F codebooks include the power-adjusted Q codewords.

Optionally, in some possible implementation manners of the present embodiments, the performing, by the base station, power adjustment on Q codebooks by using Q power factors, so as to obtain power-adjusted Q codebooks includes: performing power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Referring to FIG. 4-e, FIG. 4-e shows a power-adjusted codebook 1 and a power-adjusted codebook 2. The power-adjusted codebook 1 and codebook 2 have a same non-zero codeword position, but have different power. It should be understood that, after a power factor is introduced, if a size of an original codebook group is K, and a size of a power factor set is P, a size of a new codebook set may be K*P.

405. The base station separately decodes the received signal by using the G codebook groups.

Each codebook group of the G codebook groups includes at least one codebook.

The power-adjusted Q codewords are a subset of codebooks included in the G codebook groups. It is found from practice that average amplitudes of some of the power-adjusted Q codewords may be identical or average amplitudes of the power-adjusted Q codewords may be different from each other, which helps improve accuracy of signal decoding and reduce a bit error rate of decoding, and helps improve flexibility of signal decoding.

G is a positive integer and G is greater than 1.

The received signal may be separately decoded by using the G codebook groups in various manners.

For example, the received signal obtained on the M resource blocks is a received signal $S_i$, and the separately decoding the received signal by using the G codebook groups includes the following steps.

Step S01: Let i=1.

Step S02: Determine whether i is greater than G.

If i is greater than G, the procedure ends.

If i is not greater than G, step S03 is performed.

Step S03: Decode a received signal $S_i$ by using the $i^{th}$ codebook group of the G codebook groups, so as to obtain a bit sequence $D_i$.

Step S04: Determine whether i is less than G.

If i is not less than G, the procedure ends.

If i is less than G, step S05 is performed.

Step S05: Perform interference cancellation processing on the received signal $S_i$ by using the bit sequence $D_i$, so as to obtain a received signal $S_{i+1}$.

Optionally, in some possible implementation manners of the present embodiments, the performing interference cancellation processing on the received signal $S_i$ by using the bit sequence $D_i$, so as to obtain a received signal $S_{i+1}$ may include: mapping the bit sequence $D_i$ to $m_i$ codewords in the $i^{th}$ codebook group; obtaining a modulation symbol $X_i$ based on the $m_i$ codewords; multiplying the modulation symbol $X_i$ and a channel gain corresponding to the $i^{th}$ codebook group to obtain a product $Z_i$; and subtracting the product $Z_i$ from the received signal $S_i$ so as to obtain the received signal $S_{i+1}$.

Optionally, in some possible implementation manners of the present embodiments, the bit sequence $D_i$ is a bit sequence whose likelihood value is the largest, the second largest, or the third largest among $N_i$ bit sequences that are obtained by decoding the received signal $S_i$ by using the $i^{th}$ codebook group of the G codebook groups.

Step S06: Let i=i+1, and return to step S02.

Certainly, the base station may separately decode the received signal by using the G codebook groups in another manner shown in an example in another embodiment.

Optionally, in some possible implementation manners of the present embodiments, average power corresponding to the $i^{th}$ codebook group of the G codebook groups is greater than average power corresponding to the $(i+1)^{th}$ codebook group of the G codebook groups. It is found from practice that a signal is first decoded by using a codebook group with relatively large average power, and the signal is then decoded by using a codebook group with relatively high average power, which helps improve accuracy of decoding and reduce a bit error rate of decoding.

It may be learned that, in the solutions of this embodiment, after obtaining a received signal on M resource blocks, a base station separately decodes the received signal by using G codebook groups that are obtained by grouping all codebooks used on the M resource blocks, that is, the base station decodes the received signal once by using one group of codebooks in the G codebook groups (that is, some possible codebooks are used). Because complexity of single decoding and a codebook quantity are in an exponential relationship, the solutions of this embodiment of the present invention help greatly reduce complexity of a signal decoding operation at a receiver, while all possible codebooks are referred to at the same time for one time of conventional decoding. For example, it is assumed that complexity of a conventional signal decoding algorithm is represented as $P^F$, while complexity of the solutions of this embodiment of the present invention approximates to $G*P^{F/G}$, where F is a total quantity of all codebooks used on M resource blocks, and when F is relatively large, $G*P^{F/G}$ is far less than $P^F$.

Referring to FIG. 5-a, FIG. 5-a is a schematic flowchart of another data communication method according to another embodiment of the present invention. As shown in an example in FIG. 5-a, another data communication method provided in another embodiment of the present invention may include the following steps.

501. A base station sends, to a first user terminal, a control message that carries a first configuration indication.

The first configuration indication is used to indicate Q codebooks allocated to the first user terminal and power factors (that is, Q power factors) corresponding to all the Q codebooks. Q is a positive integer. The Q power factors and the Q codebooks are in a one-to-one correspondence. Optionally, the Q power factors are different from each other or some of the power factors are identical. For example, power factors corresponding to a codebook a1 and a codebook b1 in the Q codebooks are different. The codebook a1 and the codebook b1 may be any two codebooks of the Q codebooks.

For example, Q may be equal to 1, 2, 3, 4, 6, 8, 15, or another positive integer.

502. The first user terminal receives, from the base station, the control message that carries the first configuration indication.

The first user terminal maps Q to-be-transmitted bit sequences to Q codewords in the Q codebooks, where Q is a positive integer, and the Q bit sequences and the Q codewords are in a one-to-one correspondence; the first user terminal performs power adjustment on the Q codewords by using the Q power factors, so as to obtain power-adjusted Q codewords, where the Q power factors and the Q codebooks to which the Q codewords belong are in a one-to-one correspondence; the first user terminal obtains a modulation symbol based on the power-adjusted Q codewords; and the first user terminal sends the modulation symbol on M (M is a positive integer) resource blocks.

Optionally, in some possible implementation manners of the present embodiments, the performing power adjustment on the Q codewords by using the Q power factors, so as to obtain power-adjusted Q codewords includes: performing power adjustment on the Q codewords by using the Q power factors according to a power adjustment formula:

$$\bar{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\bar{x}_k(g)$ in the power adjustment formula represents a power-adjusted codeword obtained by performing power adjustment on $x_k(g)$ by using $\alpha_k$. The codebook k may be any codebook in the Q codebooks.

The first user terminal may obtain the modulation symbol according to a formula:

$$y(g) = \sum_{k=1}^{K} \bar{x}_k(g)$$

based on the Q codewords, where $\bar{x}_k(g)$ in the formula represents a codeword g in the power-adjusted Q codewords, and y(g) represents the modulation symbol obtained based on the Q codewords.

Different codewords in a codebook may represent bit sequences of different values. Therefore, the power-adjusted Q codebooks may be searched for the Q codewords that are in a one-to-one correspondence with the Q to-be-transmitted bit sequences, so that the Q to-be-transmitted bit sequences are mapped to the Q codewords in the power-adjusted Q codebooks.

Lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. A schematic diagram of a specific processing architecture in such a scenario may be shown in an example in FIG. 5-b. Particularly, at least two bit sequences in the Q bit sequences may be captured from a same data stream. A schematic diagram of a specific processing architecture in such a scenario may be shown in an example in FIG. 5-c. Alternatively, a bit sequence of the Q bit sequences may be captured from at least two data streams. A schematic diagram of a specific processing architecture in such a scenario may be shown in an example in FIG. 5-d.

503. The base station obtains a received signal on M resource blocks.

For example, one or more user terminals that include the first user terminal may each send a signal on the M resource blocks. Therefore, the received signal obtained by the base station on the M resource blocks may be from the one or more user terminals that include the first user terminal.

504. The base station performs power adjustment on Q codebooks by using Q power factors, so as to obtain power-adjusted Q codebooks, where the base station groups all codebooks (F codebooks) used on the M resource blocks, to obtain G codebook groups.

For a specific implementation manner of step 504, refer to step 404.

505. The base station separately decodes the received signal by using the G codebook groups.

Each codebook group of the G codebook groups includes at least one codebook.

The power-adjusted Q codewords are a subset of codebooks included in the G codebook groups. It is found from practice that average amplitudes of some of the power-adjusted Q codewords may be identical or average amplitudes of the power-adjusted Q codewords may be different from each other, which helps improve accuracy of signal decoding and reduce a bit error rate of decoding, and helps improve flexibility of signal decoding.

G is a positive integer and G is greater than 1.

The received signal may be separately decoded by using the G codebook groups in various manners.

For a specific implementation manner of step 505, refer to step 405.

It may be learned that, in the solutions of this embodiment, after obtaining a received signal on M resource blocks, a base station separately decodes the received signal by using G codebook groups that are obtained by grouping all codebooks used on the M resource blocks, that is, the base station decodes the received signal once by using one group of codebooks in the G codebook groups (that is, some possible codebooks are used). Because complexity of single decoding and a codebook quantity are in an exponential relationship, the solutions of this embodiment of the present invention help greatly reduce complexity of a signal decoding operation at a receiver, while all possible codebooks are referred to at the same time for one time of conventional decoding. For example, it is assumed that complexity of a conventional signal decoding algorithm is represented as $P^F$, while complexity of the solutions of this embodiment of the present invention approximates to $G*P^{F/G}$, where F is a total quantity of all codebooks used on M resource blocks, and when F is relatively large, $G*P^{F/G}$ is far less than $P^F$.

The embodiments of the present invention further provide a related apparatus used to implement the foregoing solutions.

Figure 6:
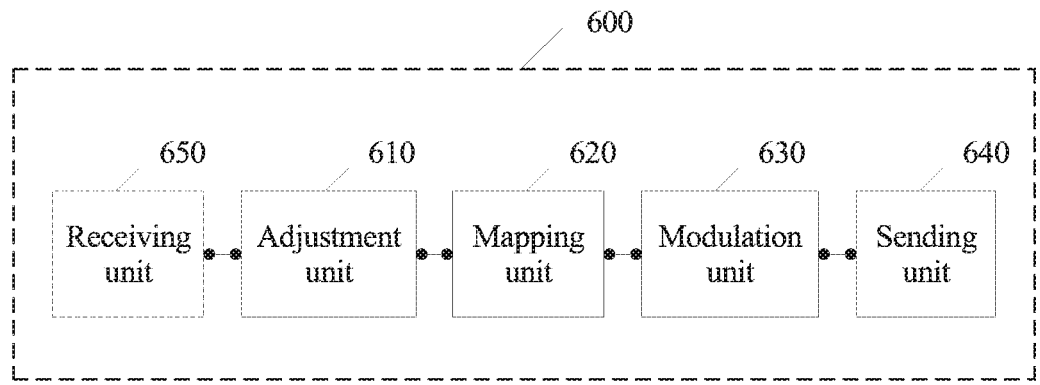
FIG. 6 is a schematic architecture diagram of a communications device according to an embodiment of the present invention.

Referring to FIG. 6, an embodiment of the present invention further provides a communications device 600 that may include: an adjustment unit 610, a mapping unit 620, a modulation unit 630, and a sending unit 640.

The adjustment unit 610 is configured to perform power adjustment on Q codebooks by using Q power factors, so as to obtain power-adjusted Q codebooks, where Q is a positive integer, and the Q power factors and the Q codebooks are in a one-to-one correspondence.

The mapping unit 620 is configured to map Q to-be-transmitted bit sequences to Q codewords in the power-adjusted Q codebooks, where the Q bit sequences and the Q codewords are in a one-to-one correspondence.

The modulation unit 630 is configured to obtain a modulation symbol based on the Q codewords.

The sending unit 640 is configured to send the modulation symbol on a resource block.

Optionally, in some possible implementation manners of the present embodiments, the adjustment unit 610 is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Optionally, in some possible implementation manners of the present embodiments, the Q power factors are selected from a candidate power factor set that includes M candidate power factors. For example, the Q power factors may be selected, according to a need, from the candidate power factor set that includes the M candidate power factors. Because some of the power factors may be identical, M may be greater than, or equal to, or less than Q.

Optionally, in some possible implementation manners of the present embodiments, a power factor i in the Q power factors and a codebook j in the Q codebooks are in a one-to-one correspondence, where a value of the power factor i is determined based on a code rate of the codebook j and/or a modulation order of the codebook j.

Optionally, in some possible implementation manners of the present embodiments, each bit sequence of the Q bit sequences is captured from a different data stream of Q data streams.

Optionally, the Q codebooks are SCMA codebooks or codebooks of another type. A codeword in the Q codebooks may be a complex number vector or a codeword in another form.

Optionally, in some possible implementation manners of the present embodiments, the Q power factors are different from each other or some of the power factors are identical.

Optionally, in some possible implementation manners of the present embodiments, the communications device 600 further includes a receiving unit 650, configured to: before the adjustment unit performs power adjustment on Q codebooks by using Q power factors, so as to obtain power-adjusted Q codebooks, receive codebook configuration information, where the codebook configuration information is used to indicate the Q codebooks and the Q power factors allocated to the communications device 600.

Optionally, in some possible implementation manners of the present embodiments, the communications device 600 is a base station or a user terminal.

It may be understood that functions of each function module in the communications device 600 in this embodiment may be specifically implemented according to the methods in the foregoing method embodiments. For a specific implementation process, refer to related descriptions of the foregoing method embodiments. Details are not described herein again.

It may be learned that, in the technical solutions of this embodiment, the communications device 600 performs power adjustment on Q codebooks by using Q power factors, so as to obtain power-adjusted Q codebooks, and maps Q to-be-transmitted bit sequences to Q codewords in the power-adjusted Q codebooks. In this way, powers of the Q codewords used to represent the Q bit sequences may be different, and it is found from tests and practice that, using Q codewords of different powers to represent the Q bit sequences at a transmitter helps improve signal decoding quality at a receiver, and the Q codewords of different powers helps design a more optimized decoding algorithm with lower complexity, and further helps greatly reduce complexity of a signal decoding operation at the receiver in a communications system.

Figure 7:
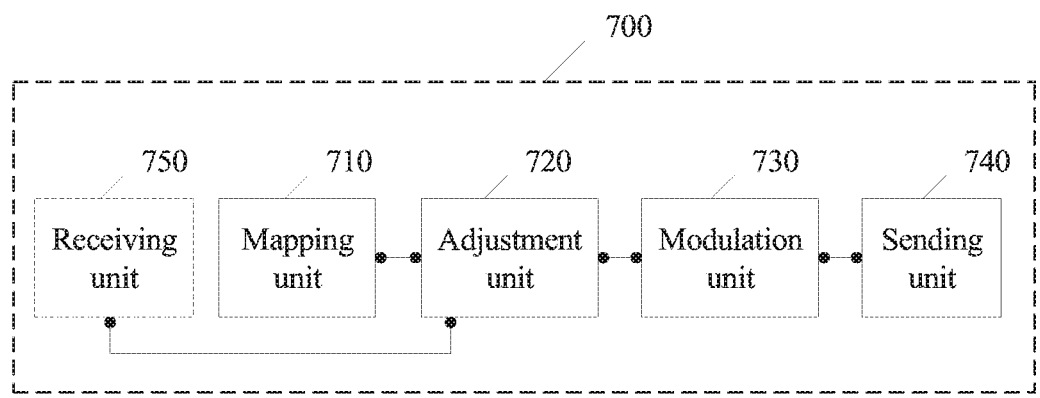
FIG. 7 is a schematic architecture diagram of another communications device according to an embodiment of the present invention.

Referring to FIG. 7, an embodiment of the present invention further provides a communications device 700 that may include: a mapping unit 710, an adjustment unit 720, a modulation unit 730, and a sending unit 740.

The mapping unit 710 is configured to map Q to-be-transmitted bit sequences to Q codewords in Q codebooks, where Q is a positive integer, and the Q bit sequences and the Q codewords are in a one-to-one correspondence, where for example, Q may be equal to 1, 2, 3, 4, 6, 8, 15, or another positive integer.

The adjustment unit 720 is configured to perform power adjustment on the Q codewords by using Q power factors, so as to obtain power-adjusted Q codewords, where the Q power factors and the Q codebooks to which the Q codewords belong are in a one-to-one correspondence.

The modulation unit 730 is configured to obtain a modulation symbol based on the power-adjusted Q codewords.

The sending unit 740 is configured to send the modulation symbol on a resource block.

Optionally, in some possible implementation manners of the present embodiments, the adjustment unit 720 is specifically configured to perform power adjustment on the Q codewords by using the Q power factors according to a power adjustment formula:

$$\overline{x}_k(g) = \alpha_k * x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\overline{x}_k(g)$ in the power adjustment formula represents a power-adjusted codeword obtained by performing power adjustment on $x_k(g)$ by using $\alpha_k$.

Optionally, in some possible implementation manners of the present embodiments, the Q power factors are selected from a candidate power factor set that includes M candidate power factors.

Optionally, in some possible implementation manners of the present embodiments, a power factor i in the Q power factors and a codebook j in the Q codebooks are in a one-to-one correspondence, where a value of the power factor i is determined based on a code rate of the codebook j and/or a modulation order of the codebook j.

Optionally, in some possible implementation manners of the present embodiments, lengths of the Q bit sequences may be the same or different. For example, a quantity of bits in a bit sequence of the Q bit sequences may be 1, 2, 4, 5, 6, 8, 12, 15, 16, 24, or another value. Optionally, each bit sequence of the Q bit sequences may be captured from different data streams in Q data streams. Particularly, at least two bit sequences in the Q bit sequences may be captured from a same data stream, or a bit sequence of the Q bit sequences may be captured from at least two data streams.

Optionally, in some possible implementation manners of the present embodiments, the Q codebooks are sparse code multiple access (SCMA) codebooks, where a codeword in the Q codebooks is a complex number vector.

Optionally, in some possible implementation manners of the present embodiments, the Q power factors are different from each other or some of the power factors are identical.

Optionally, in some possible implementation manners of the present embodiments, the communications device 700 further includes: a receiving unit 750, configured to: before the mapping unit maps Q to-be-transmitted bit sequences to Q codewords in Q codebooks, receive codebook configuration information, where the codebook configuration information is used to indicate the Q codebooks and the Q power factors allocated to the communications device.

Optionally, in some possible implementation manners of the present embodiments, the communications device 700 may be a base station or a user terminal.

It may be understood that functions of each function module in the communications device 700 in this embodiment may be specifically implemented according to the methods in the foregoing method embodiments. For a specific implementation process, refer to related descriptions of the foregoing method embodiments. Details are not described herein again.

It may be learned that, in the solutions of this embodiment, after mapping Q to-be-transmitted bit sequences to Q codewords in Q codebooks, the communications device 700 performs power adjustment on the Q codewords by using Q power factors, so as to obtain power-adjusted Q codewords, obtains a modulation symbol based on the power-adjusted Q codewords, and then sends the modulation symbol. Power adjustment is performed on the Q codewords used to indicate the Q bit sequences, so that powers of the Q codewords used to represent the Q bit sequences may be different. It is found from tests and practice that, using Q codewords of different powers to represent the Q bit sequences at a transmitter helps improve signal decoding quality at a receiver, and the Q codewords of different powers helps design a more optimized decoding algorithm with lower complexity, and further helps reduce complexity of a signal decoding operation at the receiver in a communications system.

Figure 8:
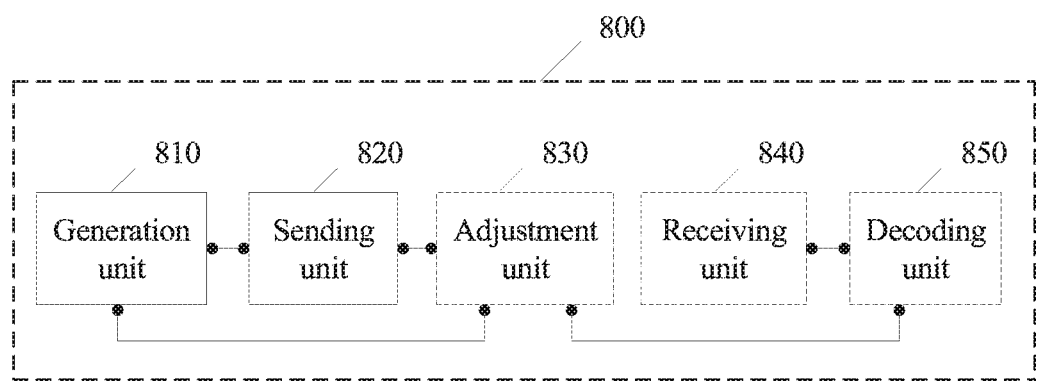
FIG. 8 is a schematic architecture diagram of another communications device according to an embodiment of the present invention.

Referring to FIG. 8, an embodiment of the present embodiments further provides a communications device 800 that may include: a generation unit 810, configured to generate codebook configuration information; and a sending unit 820, configured to send the codebook configuration information to a first communications device, where the codebook configuration information is used to indicate Q codebooks and Q power factors allocated to the first communications device, and the Q codebooks and the Q power factors are in a one-to-one correspondence.

Optionally, in some possible implementation manners of the present embodiments, the Q codebooks are SCMA codebooks, where a codeword in the Q codebooks is a complex number vector.

Optionally, in some possible implementation manners of the present embodiments, the Q power factors are different from each other or some of the power factors are identical.

Optionally, in some possible implementation manners of the present embodiments, the communications device 800 further includes: an adjustment unit 830, configured to perform power adjustment on the Q codebooks by using the Q power factors, so as to obtain power-adjusted Q codebooks; a receiving unit 840, configured to obtain a received signal on a resource block; and a decoding unit 850, configured to perform decoding processing on the received signal by using F codebooks, where the F codebooks are all codebooks used on the resource block, F is an integer greater than 1, and the F codebooks include the power-adjusted Q codewords.

Optionally, in some possible implementation manners of the present embodiments, F is equal to Q.

Optionally, in some possible implementation manners of the present embodiments, the adjustment unit 830 is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Optionally, in some possible implementation manners of the present embodiments, the decoding unit 850 is specifically configured to group the F codebooks into G codebook groups, and separately decode the received signal by using the G codebook groups, where each codebook group of the G codebook groups includes at least one codebook, and G is an integer greater than 1.

Optionally, in some possible implementation manners of the present embodiments, the received signal obtained on the resource block is a received signal $S_i$, and in the aspect of separately decoding the received signal by using the G codebook groups, the decoding unit 850 is specifically configured to: if i is less than G, decode the received signal $S_i$ by using the $i^{th}$ codebook group of the G codebook groups, so as to obtain a bit sequence $D_i$, perform interference cancellation processing on the received signal $S_i$ by using the bit sequence $D_i$, so as to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, in the aspect of performing interference cancellation processing on the received signal $S_i$ by using the bit sequence $D_i$, so as to obtain a received signal $S_{i+1}$, the decoding unit 850 is specifically configured to: map the bit sequence $D_i$ to $m_i$ codewords in the $i^{th}$ codebook group; obtain a modulation symbol $X_i$ based on the $m_i$ codewords; multiply the modulation symbol $X_i$ and a channel gain corresponding to the $i^{th}$ codebook group to obtain a product $Z_i$; and subtract the product $Z_i$ from the received signal $S_i$ so as to obtain the received signal $S_{i+1}$.

Optionally, in some possible implementation manners of the present embodiments, the bit sequence $D_i$ is a bit sequence whose likelihood value is the largest among $N_i$ bit sequences that are obtained by decoding the received signal $S_i$ by using the $i^{th}$ codebook group of the G codebook groups.

Optionally, in some possible implementation manners of the present embodiments, the received signal obtained on the resource block is a received signal $S_i$, and in the aspect of separately decoding the received signal by using the G codebook groups, the decoding unit 850 is specifically configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, the received signal obtained on the M resource blocks is a received signal $S_i$, and in the aspect of separately decoding the received signal by using the G codebook groups, the decoding unit 850 is specifically configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_i$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, perform interference cancellation processing on the received signal $S_i$ by using the bit sequence $D_i$, so as to obtain a received signal $S_{i+1}$, and assign i+1 to i; or if a cyclic redundancy check on the bit sequence $D_i$ fails, obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, average power corresponding to the $i^{th}$ codebook group of the G codebook groups is greater than average power corresponding to the $(i+1)^{th}$ codebook group of the G codebook groups.

Optionally, in some possible implementation manners of the present embodiments, the first communications device is a base station, and the communications device 800 is a user terminal; or the communications device 800 is a base station, and the first communications device is a user terminal.

It may be understood that functions of each function module in the communications device 800 in this embodiment may be specifically implemented according to the methods in the foregoing method embodiments. For a specific implementation process, refer to related descriptions of the foregoing method embodiments. Details are not described herein again.

It may be learned that, in the solutions of this embodiment, the communications device 800 sends codebook configuration information to a first communications device, where the codebook configuration information is used to indicate Q codebooks and Q power factors allocated to the first communications device, so that the first communications device performs power adjustment on the Q codebooks or codewords in the Q codebooks by using the Q power factors. When power adjustment is performed on Q codewords used to indicate Q bit sequences, powers of the Q codewords used to represent the Q bit sequences may be different. It is found from tests and practice that, using Q codewords of different powers to represent the Q bit sequences at a transmitter (the first communications device) helps improve signal decoding quality at a receiver, and the Q codewords of different powers helps design a more optimized decoding algorithm with lower complexity, and further helps reduce complexity of a signal decoding operation at the receiver in a communications system.

Figure 9:
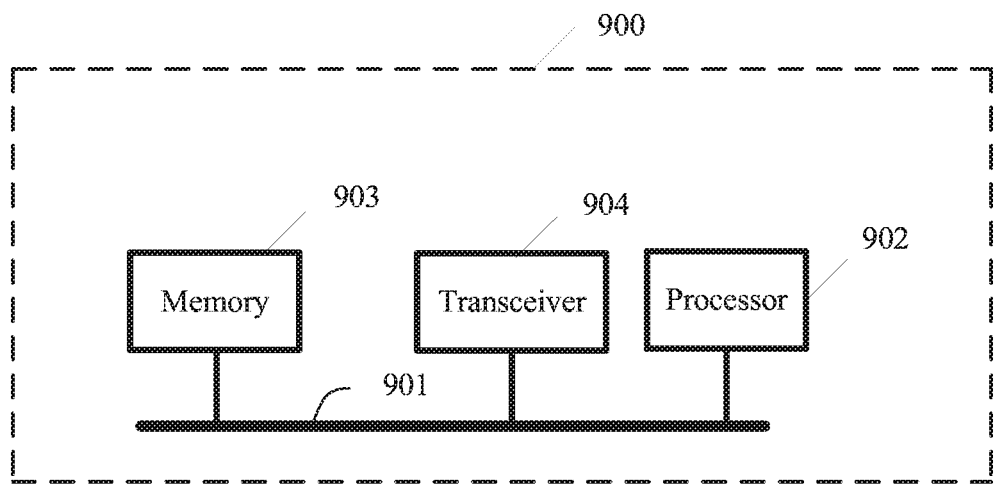
FIG. 9 is a schematic architecture diagram of another communications device according to an embodiment of the present invention.

Referring to FIG. 9, an embodiment of the present embodiments further provides a communications device 900, including: a processor 902, a memory 903, and a transceiver 904 that are connected by using a bus 901.

The processor 902 invokes, by using the bus 901, code stored in the memory 903, to perform power adjustment on Q codebooks by using Q power factors, so as to obtain power-adjusted Q codebooks, where Q is a positive integer, and the Q power factors and the Q codebooks are in a one-to-one correspondence; map Q to-be-transmitted bit sequences to Q codewords in the power-adjusted Q codebooks, where the Q bit sequences and the Q codewords are in a one-to-one correspondence; and obtain a modulation symbol based on the Q codewords.

The transceiver 904 is configured to send the modulation symbol on a resource block.

Optionally, in some possible implementation manners of the present embodiments, the processor 902 is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Optionally, in some possible implementation manners of the present embodiments, the Q power factors are selected from a candidate power factor set that includes M candidate power factors.

Optionally, in some possible implementation manners of the present embodiments, a power factor i in the Q power factors and a codebook j in the Q codebooks are in a one-to-one correspondence, where a value of the power factor i is determined based on a code rate of the codebook j and/or a modulation order of the codebook j.

Optionally, in some possible implementation manners of the present embodiments, each bit sequence of the Q bit sequences is captured from a different data stream of Q data streams.

Optionally, in some possible implementation manners of the present embodiments, the Q codebooks are SCMA codebooks, where a codeword in the Q codebooks is a complex number vector.

Optionally, in some possible implementation manners of the present embodiments, the Q power factors are different from each other or some of the power factors are identical.

Optionally, in some possible implementation manners of the present embodiments, the transceiver 904 is further configured to: before the processor 902 performs power adjustment on Q codebooks by using Q power factors, so as to obtain power-adjusted Q codebooks, receive codebook configuration information, where the codebook configuration information is used to indicate the Q codebooks and the Q power factors allocated to the communications device.

Optionally, in some possible implementation manners of the present embodiments, the communications device 900 is a base station or a user terminal.

It may be understood that functions of each function module in the communications device 900 in this embodiment may be specifically implemented according to the methods in the foregoing method embodiments. For a specific implementation process, refer to related descriptions of the foregoing method embodiments. Details are not described herein again.

It may be learned that, in the technical solutions of this embodiment, the communications device 900 performs power adjustment on Q codebooks by using Q power factors, so as to obtain power-adjusted Q codebooks, and maps Q to-be-transmitted bit sequences to Q codewords in the power-adjusted Q codebooks. In this way, powers of the Q codewords used to represent the Q bit sequences may be different, and it is found from tests and practice that, using Q codewords of different powers to represent the Q bit sequences at a transmitter helps improve signal decoding quality at a receiver, and the Q codewords of different powers helps design a more optimized decoding algorithm with lower complexity, and further helps greatly reduce complexity of a signal decoding operation at the receiver in a communications system.

Figure 10:
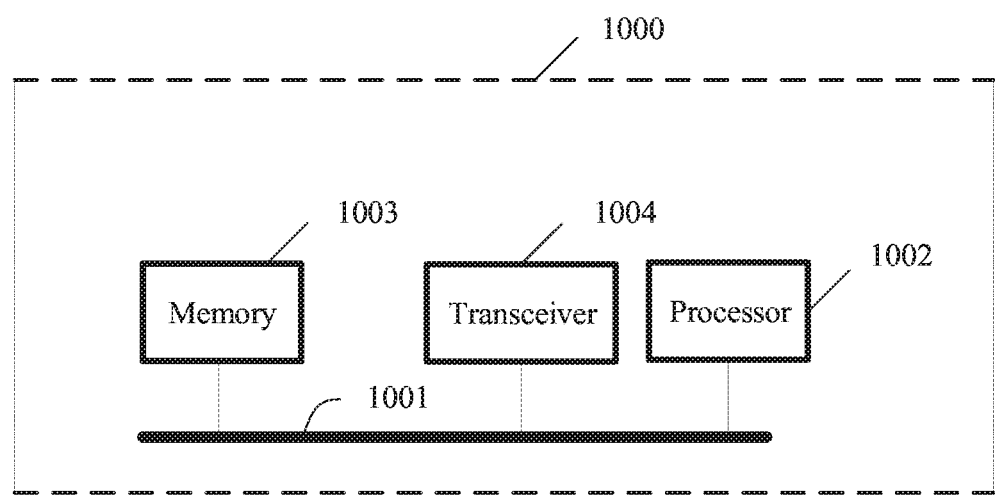
FIG. 10 is a schematic architecture diagram of another communications device according to an embodiment of the present invention.

Referring to FIG. 10, an embodiment of the present invention further provides a communications device 1000, including: a processor 1002, a memory 1003, and a transceiver 1004 that are connected by using a bus 1001.

The processor 1002 invokes, by using the bus 1001, code stored in the memory 1003, to map Q to-be-transmitted bit sequences to Q codewords in Q codebooks, where Q is a positive integer, and the Q bit sequences and the Q codewords are in a one-to-one correspondence; perform power adjustment on the Q codewords by using Q power factors, so as to obtain power-adjusted Q codewords, where the Q power factors and the Q codebooks to which the Q codewords belong are in a one-to-one correspondence; and obtain a modulation symbol based on the power-adjusted Q codewords.

The transceiver 1004 is configured to send the modulation symbol on a resource block.

Optionally, in some possible implementation manners of the present embodiments, the processor 1002 is specifically configured to perform power adjustment on the Q codewords by using the Q power factors according to a power adjustment formula:

$$\bar{x}_k(g) = \alpha_k x_k(g),$$

so as to obtain the power-adjusted Q codewords, where $x_k(g)$ in the power adjustment formula represents a codeword g in a codebook k in the Q codebooks, $\alpha_k$ in the power adjustment formula represents a power factor corresponding to the codebook k, and $\bar{x}_k(g)$ in the power adjustment formula represents a power-adjusted codeword obtained by performing power adjustment on $x_k(g)$ by using $\alpha_k$.

Optionally, in some possible implementation manners of the present embodiments, the Q power factors are selected from a candidate power factor set that includes M candidate power factors.

Optionally, in some possible implementation manners of the present embodiments, a power factor i in the Q power factors and a codebook j in the Q codebooks are in a one-to-one correspondence, where a value of the power factor i is determined based on a code rate of the codebook j and/or a modulation order of the codebook j.

Optionally, in some possible implementation manners of the present embodiments, each bit sequence of the Q bit sequences is captured from a different data stream of Q data streams.

Optionally, in some possible implementation manners of the present embodiments, the Q codebooks are SCMA codebooks, where a codeword in the Q codebooks is a complex number vector.

Optionally, in some possible implementation manners of the present embodiments, the Q power factors are different from each other or some of the power factors are identical.

Optionally, in some possible implementation manners of the present embodiments, the transceiver is further configured to: before the processor maps Q to-be-transmitted bit sequences to Q codewords in Q codebooks, receive codebook configuration embodiments, where the codebook configuration information is used to indicate the Q codebooks and the Q power factors allocated to the communications device.

Optionally, in some possible implementation manners of the present embodiments, the communications device 1000 is a base station or a user terminal.

It may be understood that functions of each function module in the communications device 1000 in this embodiment may be specifically implemented according to the methods in the foregoing method embodiments. For a specific implementation process, refer to related descriptions of the foregoing method embodiments. Details are not described herein again.

It may be learned that, in the solutions of this embodiment, after mapping Q to-be-transmitted bit sequences to Q codewords in Q codebooks, the communications device 1000 performs power adjustment on the Q codewords by using Q power factors, so as to obtain power-adjusted Q codewords, obtains a modulation symbol based on the power-adjusted Q codewords, and then sends the modulation symbol. Power adjustment is performed on the Q codewords used to indicate the Q bit sequences, so that powers of the Q codewords used to represent the Q bit sequences may be different. It is found from tests and practice that, using Q codewords of different powers to represent the Q bit sequences at a transmitter helps improve signal decoding quality at a receiver, and the Q codewords of different powers helps design a more optimized decoding algorithm with lower complexity, and further helps reduce complexity of a signal decoding operation at the receiver in a communications system.

Figure 11:
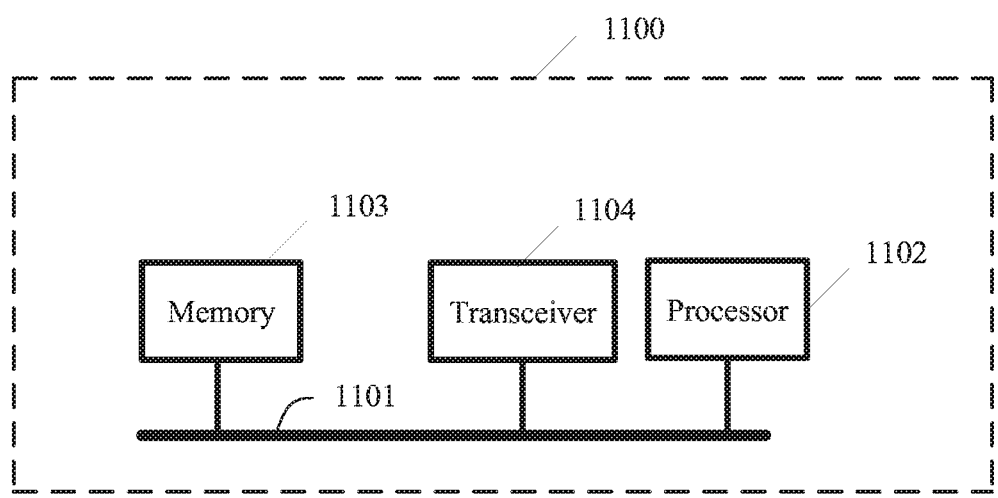
FIG. 11 is a schematic architecture diagram of another communications device according to an embodiment of the present invention.

Referring to FIG. 11, an embodiment of the present invention further provides a communications device 1100, including: a processor 1102, a memory 1103, and a transceiver 1104 that are connected by using a bus 1101.

The processor 1102 invokes, by using the bus 1101, code stored in the memory 1103, to generate codebook configuration information.

The transceiver is configured to send the codebook configuration information to a first communications device, where the codebook configuration information is used to indicate Q codebooks and Q power factors allocated to the first communications device, and the Q codebooks and the Q power factors are in a one-to-one correspondence.

Optionally, in some possible implementation manners of the present embodiments, the Q codebooks are SCMA codebooks, where a codeword in the Q codebooks is a complex number vector.

Optionally, in some possible implementation manners of the present embodiments, the Q power factors are different from each other or some of the power factors are identical.

Optionally, in some possible implementation manners of the present embodiments, the processor is further configured to perform power adjustment on the Q codebooks by using the Q power factors, so as to obtain power-adjusted Q codebooks; obtain a received signal on a resource block by using the transceiver; and perform decoding processing on the received signal by using F codebooks, where the F codebooks are all codebooks used on the resource block, F is an integer greater than 1, and the F codebooks include the power-adjusted Q codewords.

Optionally, in some possible implementation manners of the present embodiments, F is equal to or not equal to Q.

Optionally, in some possible implementation manners of the present embodiments, the processor is specifically configured to perform power adjustment on the Q codebooks by using the Q power factors according to a power adjustment formula:

$$\overline{C}_k = \alpha_k * C_k,$$

so as to obtain the power-adjusted Q codebooks, where $C_k$ in the power adjustment formula represents a codebook k in the Q codebooks, $\alpha_k$ in the power adjustment formula represents a power factor corresponding to the codebook k, and $\overline{C}_k$ in the power adjustment formula represents a power-adjusted codebook obtained by performing power adjustment on the codebook k by using $\alpha_k$.

Optionally, in some possible implementation manners of the present embodiments, the processor is configured to group the F codebooks into G codebook groups, and separately decode the received signal by using the G codebook groups, where each codebook group of the G codebook groups includes at least one codebook, and G is an integer greater than 1.

Optionally, in some possible implementation manners of the present embodiments, the received signal obtained on the resource block is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain a bit sequence $D_i$, perform interference cancellation processing on the received signal $S_i$ by using the bit sequence $D_i$, so as to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, in the aspect of performing interference cancellation processing on the received signal $S_i$ by using the bit sequence $D_i$, so as to obtain a received signal $S_{i+1}$, the processor is configured to: map the bit sequence $D_i$ to $m_i$ codewords in the $i^{th}$ codebook group; obtain a modulation symbol $X_i$ based on the $m_i$ codewords; multiply the modulation symbol $X_i$ and a channel gain corresponding to the $i^{th}$ codebook group to obtain a product $Z_i$; and subtract the product $Z_i$ from the received signal $S_i$ so as to obtain the received signal $S_{i+1}$.

Optionally, in some possible implementation manners of the present embodiments, the bit sequence $D_i$ is a bit sequence whose likelihood value is the largest among $N_i$ bit sequences that are obtained by decoding the received signal $S_i$ by using the $i^{th}$ codebook group of the G codebook groups.

Optionally, in some possible implementation manners of the present embodiments, the received signal obtained on the resource block is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, and the $N_i$ likelihood values $L_i$ are different from each other; obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, the received signal obtained on the M resource blocks is a received signal $S_i$, and in the aspect of separately decoding the received signal by using the G codebook groups, the processor is configured to: if i is less than G, decode the received signal $S_i$ by using the $i^{th}$ codebook group of the G codebook groups, so as to obtain $N_i$ bit sequences and $N_i$ likelihood values $L_i$, where the $N_i$ bit sequences and the $N_i$ likelihood values $L_i$ are in a one-to-one correspondence, the $N_i$ likelihood values $L_i$ are different from each other, and a likelihood value $L_i$ corresponding to a bit sequence $D_i$ in the $N_i$ bit sequences is greater than another likelihood value $L_i$ in the $N_i$ likelihood values $L_i$; and if a cyclic redundancy check on the bit sequence $D_i$ succeeds, perform interference cancellation processing on the received signal $S_i$ by using the bit sequence $D_i$, so as to obtain a received signal $S_{i+1}$, and assign i+1 to i; or if a cyclic redundancy check on the bit sequence $D_i$ fails, obtain $N_i$ modulation symbols $X_i'$ based on the $N_i$ bit sequences, where the $N_i$ bit sequences and the $N_i$ modulation symbols $X_i'$ are in a one-to-one correspondence, a modulation symbol $X_{i,j}'$ in the $N_i$ modulation symbols $X_i'$ is obtained based on $m_i$ codewords in the $i^{th}$ codebook group that are obtained by mapping a bit sequence $N_{i,j}$ in the $N_i$ bit sequences, and the bit sequence $N_{i,j}$ is any bit sequence of the $N_i$ bit sequences; and obtain an average modulation symbol $X_i$ based on the $N_i$ likelihood values $L_i$ and the $N_i$ modulation symbols $X_i'$, multiply the average modulation symbol $X_i$ and a channel gain corresponding to the $i^{th}$ codebook group to obtain a product $Z_i$, subtract the product $Z_i$ from the received signal $S_i$ to obtain a received signal $S_{i+1}$, and assign i+1 to i; or if i is equal to G, decode the received signal $S_i$ by using the $i^{th}$ codebook group of the G codebook groups, so as to obtain a bit sequence $D_i$.

Optionally, in some possible implementation manners of the present embodiments, average power corresponding to the $i^{th}$ codebook group of the G codebook groups is greater than average power corresponding to the $(i+1)^{th}$ codebook group of the G codebook groups.

Optionally, in some possible implementation manners of the present embodiments, the first communications device is a base station, and the communications device 1100 is a user terminal; or the communications device 1100 is a base station, and the first communications device is a user terminal.

It may be understood that functions of each function module in the communications device 1100 in this embodiment may be specifically implemented according to the methods in the foregoing method embodiments. For a specific implementation process, refer to related descriptions of the foregoing method embodiments. Details are not described herein again.

It may be learned that, in the solutions of this embodiment, the communications device 1100 sends codebook configuration information to a first communications device, where the codebook configuration information is used to indicate Q codebooks and Q power factors allocated to the first communications device, so that the first communications device performs power adjustment on the Q codebooks or codewords in the Q codebooks by using the Q power factors. When power adjustment is performed on Q codewords used to indicate Q bit sequences, powers of the Q codewords used to represent the Q bit sequences may be different. It is found from tests and practice that, using Q codewords of different powers to represent the Q bit sequences at a transmitter (the first communications device) helps improve signal decoding quality at a receiver, and the Q codewords of different powers helps design a more optimized decoding algorithm with lower complexity, and further helps reduce complexity of a signal decoding operation at the receiver in a communications system.

Optionally, in some possible implementation manners of the present embodiments, for example, a codebook may include one or more codewords in the following codebook.

| Bit value | Codeword |
|---|---|
| 000000 | 1.2247+0.4082i 1.2247+0.4082i 1.2247+0.4082i 1.2247+0.4082i |
| 000001 | −1.2247+0.4082i 1.2247+0.4082i 1.2247−0.4082i 1.2247+0.4082i |
| 000010 | 1.2247+0.4082i 0.4082+0.4082i 1.2247+0.4082i −1.2247+0.4082i |
| 000011 | −1.2247+0.4082i 0.4082+0.4082i 1.2247−0.4082i −1.2247+0.4082i |
| 000100 | 1.2247+0.4082i −1.2247+0.4082i 0.4082+0.4082i 1.2247+0.4082i |
| 000101 | −1.2247+0.4082i −1.2247+0.4082i 0.4082−0.4082i 1.2247+0.4082i |
| 000110 | 1.2247+0.4082i −0.4082+0.4082i 0.4082+0.4082i −1.2247+0.4082i |
| 000111 | −1.2247+0.4082i −0.4082+0.4082i 0.4082−0.4082i −1.2247+0.4082i |
| 001000 | 1.2247−0.4082i 1.2247+0.4082i 1.2247+0.4082i 1.2247−0.4082i |
| 001001 | −1.2247−0.4082i 1.2247+0.4082i 1.2247−0.4082i 1.2247−0.4082i |
| 001010 | 1.2247−0.4082i 0.4082+0.4082i 1.2247+0.4082i −1.2247−0.4082i |
| 001011 | −1.2247−0.4082i 0.4082+0.4082i 1.2247−0.4082i −1.2247−0.4082i |
| 001100 | 1.2247−0.4082i −1.2247+0.4082i 0.4082+0.4082i 1.2247 −0.4082i |
| 001101 | −1.2247 −0.4082i −1.2247+0.4082i 0.4082−0.4082i 1.2247−0.4082i |
| 001110 | 1.2247−0.4082i −0.4082+0.4082i 0.4082+0.4082i −1.2247−0.4082i |
| 001111 | −1.2247−0.4082i −0.4082+0.4082i 0.4082−0.4082i −1.2247−0.4082i |
| 010000 | 1.2247+0.4082i 1.2247+0.4082i −1.2247+0.4082i 0.4082+0.4082i |
| 010001 | −1.2247+0.4082i 1.2247+0.4082i −1.2247−0.4082i 0.4082+0.4082i |
| 010010 | 1.2247+0.4082i 0.4082+0.4082i −1.2247+0.4082i −0.4082+0.4082i |
| 010011 | −1.2247+0.4082i 0.4082+0.4082i −1.2247−0.4082i −0.4082+0.4082i |
| 010100 | 1.2247+0.4082i −1.2247+0.4082i −0.4082+0.4082i 0.4082+0.4082i |
| 010101 | −1.2247+0.4082i −1.2247+0.4082i −0.4082−0.4082i 0.4082+0.4082i |
| 010110 | 1.2247+0.4082i −0.4082+0.4082i −0.4082+0.4082i −0.4082+0.4082i |
| 010111 | −1.2247+0.4082i −0.4082+0.4082i −0.4082−0.4082i −0.4082+0.4082i |
| 011000 | 1.2247−0.4082i 1.2247+0.4082i −1.2247+0.4082i 0.4082−0.4082i |
| 011001 | −1.2247−0.4082i 1.2247+0.4082i −1.2247−0.4082i 0.4082−0.4082i |
| 011010 | 1.2247−0.4082i 0.4082+0.4082i −1.2247+0.4082i −0.4082−0.4082i |
| 011011 | −1.2247−0.4082i 0.4082+0.4082i −1.2247−0.4082i −0.4082−0.4082i |
| 011100 | 1.2247−0.4082i −1.2247+0.4082i −0.4082+0.4082i 0.4082−0.4082i |
| 011101 | −1.2247−0.4082i −1.2247+0.4082i −0.4082−0.4082i 0.4082−0.4082i |
| 011110 | 1.2247−0.4082i −0.4082+0.4082i −0.4082+0.4082i −0.4082−0.4082i |
| 011111 | −1.2247−0.4082i −0.4082+0.4082i −0.4082−0.4082i −0.4082−0.4082i |
| 100000 | 0.4082+0.4082i 1.2247−0.4082i 1.2247+0.4082i 1.2247+0.4082i |
| 100001 | −0.4082+0.4082i 1.2247−0.4082i 1.2247−0.4082i 1.2247+0.4082i |
| 100010 | 0.4082+0.4082i 0.4082−0.4082i 1.2247+0.4082i −1.2247+0.4082i |
| 100011 | −0.4082+0.4082i 0.4082−0.4082i 1.2247−0.4082i −1.2247+0.4082i |
| 100100 | 0.4082+0.4082i −1.2247−0.4082i 0.4082+0.4082i 1.2247+0.4082i |
| 100101 | −0.4082+0.4082i −1.2247−0.4082i 0.4082−0.4082i 1.2247+0.4082i |
| 100110 | 0.4082+0.4082i −0.4082−0.4082i 0.4082+0.4082i −1.2247+0.4082i |
| 100111 | −0.4082+0.4082i −0.4082−0.4082i 0.4082−0.4082i −1.2247+0.4082i |
| 101000 | 0.4082−0.4082i 1.2247−0.4082i 1.2247+0.4082i 1.2247−0.4082i |
| 101001 | −0.4082−0.4082i 1.2247−0.4082i 1.2247−0.4082i 1.2247−0.4082i |
| 101010 | 0.4082−0.4082i 0.4082−0.4082i 1.2247+0.4082i −1.2247−0.4082i |
| 101011 | −0.4082−0.4082i 0.4082−0.4082i 1.2247−0.4082i −1.2247−0.4082i |
| 101100 | 0.4082−0.4082i −1.2247−0.4082i 0.4082+0.4082i 1.2247−0.4082i |

-continued

| Bit value | Codeword |
|---|---|
| 101101 | −0.4082−0.4082i −1.2247−0.4082i 0.4082−0.4082i 1.2247−0.4082i |
| 101110 | 0.4082−0.4082i −0.4082−0.4082i 0.4082+0.4082i −1.2247−0.4082i |
| 101111 | −0.4082−0.4082i −0.4082−0.4082i 0.4082−0.4082i −1.2247−0.4082i |
| 110000 | 0.4082+0.4082i 1.2247−0.4082i −1.2247+0.4082i 0.4082+0.4082i |
| 110001 | −0.4082+0.4082i 1.2247−0.4082i −1.2247−0.4082i 0.4082+0.4082i |
| 110010 | 0.4082+0.4082i 0.4082−0.4082i −1.2247+0.4082i −0.4082+0.4082i |
| 110011 | −0.4082+0.4082i 0.4082−0.4082i −1.2247−0.4082i −0.4082+0.4082i |
| 110100 | 0.4082+0.4082i −1.2247−0.4082i −0.4082+0.4082i 0.4082+0.4082i |
| 110101 | −0.4082+0.4082i −1.2247−0.4082i −0.4082−0.4082i 0.4082+0.4082i |
| 110110 | 0.4082+0.4082i −0.4082−0.4082i −0.4082+0.4082i −0.4082+0.4082i |
| 110111 | −0.4082+0.4082i −0.4082−0.4082i −0.4082−0.4082i −0.4082+0.4082i |
| 111000 | 0.4082−0.4082i 1.2247−0.4082i −1.2247+0.4082i 0.4082−0.4082i |
| 111001 | −0.4082−0.4082i 1.2247−0.4082i −1.2247−0.4082i 0.4082−0.4082i |
| 111010 | 0.4082−0.4082i 0.4082−0.4082i −1.2247+0.4082i −0.4082−0.4082i |
| 111011 | −0.4082−0.4082i 0.4082−0.4082i −1.2247−0.4082i −0.4082−0.4082i |
| 111100 | 0.4082−0.4082i −1.2247−0.4082i −0.4082+0.4082i 0.4082−0.4082i |
| 111101 | −0.4082−0.4082i −1.2247−0.4082i −0.4082−0.4082i 0.4082−0.4082i |
| 111110 | 0.4082−0.4082i −0.4082−0.4082i −0.4082+0.4082i −0.4082−0.4082i |
| 111111 | −0.4082−0.4082i −0.4082−0.4082i −0.4082−0.4082i −0.4082−0.4082i |

Terminologies such as "component," "module," and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

It should be noted that the user terminal in the embodiments of the present invention may also be referred to as a system, a subscriber unit, a subscriber station, a mobile station, a remote station, a remote terminal, a mobile device, an access terminal, a terminal, a wireless communications device, a user agent, a user apparatus, or user equipment (UE). The user terminal may be a cellular phone, a cordless phone, a Session Initiation Protocol (SIP1) phone, a wireless local loop (WLL) station, a personal digital assistant (PDA), a handheld device having a wireless communication function, an in-vehicle device, a wearable device, a computing device, or another processing device connected to a wireless modem.

In addition, the base station in the embodiments of the present invention can be used to communicate with a mobile device; and the base station may be an AP (Access Point) of WiFi, a BTS (Base Transceiver Station) in GSM (Global System for Mobile communication) or CDMA (Code Division Multiple Access); or may be an NB (NodeB) in WCDMA (Wideband Code Division Multiple Access); or may further be an eNB or eNodeB (evolved Node B, evolved NodeB) in LTE (Long Term Evolution) a relay station or an access point, a base station device in a future fifth generation (5G) network, or the like.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present embodiments essentially, or the part contributing to the prior art, or all or some of the technical solutions may be implemented in the form of a software product. The software product is stored in a storage medium and includes several instructions for instructing a computer device (which may be a personal computer, a server, or a network device, and may be specifically a processor in a computer device) to perform all or some of the steps of the foregoing methods described in the embodiments of the present invention. The foregoing storage medium may include: any medium that can store program code, such as a universal serial bus (USB) flash drive, a removable hard disk, a magnetic disk, an optical disc, a read-only memory (ROM for short), or a random access memory (RAM for short).

The foregoing embodiments are merely intended for describing the technical solutions of the present embodiments, but not for limiting the present embodiments. Although the present embodiments are described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
performing, by a first communications device, power adjustment on Q codebooks using Q power factors, according to a power adjustment formula: $\overline{C_k} = \alpha_k * C_k$, to obtain power-adjusted Q codebooks, wherein Q is a positive integer, and wherein the Q power factors and the Q codebooks are in a one-to-one correspondence, wherein $C_k$ represents a codebook k in the Q codebooks, wherein $\alpha_k$ represents a power factor corresponding to the codebook k, and wherein $\overline{C_k}$ represents a power-adjusted codebook obtained by performing power adjustment on the codebook k using $\alpha_k$;
mapping, by the first communications device, Q to-be-transmitted bit sequences to Q codewords in the power-adjusted Q codebooks, wherein the Q to-be-transmitted bit sequences and the Q codewords are in a one-to-one correspondence;
obtaining, by the first communications device, a modulation symbol based on the Q codewords; and
sending, by the first communications device, the modulation symbol on a resource block.

2. The method according to claim 1, wherein the Q power factors are selected from a candidate power factor set that comprises M candidate power factors.

3. The method according to claim 1, wherein a power factor i in the Q power factors and a codebook j in the Q codebooks are in a one-to-one correspondence, and wherein a value of the power factor i is determined based on a code rate or a modulation order of the codebook j.

4. The method according to claim 1, wherein each bit sequence of the Q to-be-transmitted bit sequences is captured from a different data stream of Q data streams.

5. The method according to claim 1, wherein the Q codebooks are sparse code multiple access (SCMA) codebooks, and wherein a codeword in the Q codebooks is a complex number vector.

6. The method according to claim 1, wherein the Q power factors are different from each other.

7. The method according to claim 1, the method further comprising:
receiving, by the first communications device, codebook configuration information, before performing power adjustment on the Q codebooks, wherein the codebook configuration information indicates the Q codebooks and the Q power factors allocated to the first communications device.

8. The method according to claim 1, wherein the first communications device is a base station or a user terminal.

9. A non-transitory computer readable storage medium storing a program for execution by a processor, the program including instructions to:
perform power adjustment on Q codebooks using Q power factors, according to a power adjustment formula: $\overline{C_k} = \alpha_k * C_k$, to obtain power-adjusted Q codebooks, wherein Q is a positive integer, and wherein the Q power factors and the Q codebooks are in a one-to-one correspondence, wherein $C_k$ represents a codebook k in the Q codebooks, wherein $\alpha_k$ represents a power factor corresponding to the codebook k, and wherein $\overline{C_k}$ represents a power-adjusted codebook obtained by performing power adjustment on the codebook k using $\alpha_k$;
map Q to-be-transmitted bit sequences to Q codewords in the power-adjusted Q codebooks, wherein the Q to-be-transmitted bit sequences and the Q codewords are in a one-to-one correspondence;
obtain a modulation symbol based on the Q codewords; and
send the modulation symbol on a resource block.

10. The non-transitory computer readable storage medium according to claim 9, wherein the Q power factors are selected from a candidate power factor set that comprises M candidate power factors.

11. The non-transitory computer readable storage medium according to claim 9, wherein a power factor i in the Q power factors and a codebook j in the Q codebooks are in a one-to-one correspondence, wherein a value of the power factor i is determined based on a code rate or a modulation order of the codebook j.

12. The non-transitory computer readable storage medium according to claim 9, wherein each bit sequence of the Q to-be-transmitted bit sequences is captured from a different data stream of Q data streams.

13. The non-transitory computer readable storage medium according to claim 9, wherein the Q codebooks are sparse code multiple access (SCMA) codebooks, and wherein a codeword in the Q codebooks is a complex number vector.

14. The non-transitory computer readable storage medium according to claim 9, wherein some of the Q power factors are identical.

15. The non-transitory computer readable storage medium according to claim 9, wherein the instructions further comprise instructions to:
receive codebook configuration information, before performing power adjustment on the Q codebooks, wherein the codebook configuration information indicates the Q codebooks and the Q power factors allocated to a communications device, wherein the processor is on the communications device.

16. The non-transitory computer readable storage medium according to claim 9, wherein processor is on a base station or a user terminal.

17. A communications device, comprising:
a processor; and
a non-transitory computer readable storage medium storing a program for execution by the processor, the program including instructions to:
perform power adjustment on Q codebooks using Q power factors, according to a power adjustment formula: $\overline{C_k} = \alpha_k * C_k$, to obtain power-adjusted Q codebooks, wherein Q is a positive integer, and wherein the Q power factors and the Q codebooks are in a one-to-one correspondence, wherein $C_k$ represents a codebook k in the Q codebooks, wherein $\alpha_k$ represents a power factor corresponding to the codebook k, and wherein $\overline{C_k}$ represents a power-adjusted codebook obtained by performing power adjustment on the codebook k using $\alpha_k$;
map Q to-be-transmitted bit sequences to Q codewords in the power-adjusted Q codebooks, wherein the Q to-be-transmitted bit sequences and the Q codewords are in a one-to-one correspondence;

obtain a modulation symbol based on the Q codewords; and send the modulation symbol on a resource block.

18. The communications device according to claim 17, wherein the Q power factors are selected from a candidate power factor set that comprises M candidate power factors.

19. The communications device according to claim 17, wherein a power factor i in the Q power factors and a codebook j in the Q codebooks are in a one-to-one correspondence, and wherein a value of the power factor i is determined based on a code rate or a modulation order of the codebook j.

20. The communications device according to claim 17, wherein each bit sequence of the Q to-be-transmitted bit sequences is captured from a different data stream of Q data streams.

21. The communications device according to claim 17, wherein the Q codebooks are sparse code multiple access (SCMA) codebooks, and wherein a codeword in the Q codebooks is a complex number vector.

22. The communications device according to claim 17, wherein the Q power factors are different from each other.

23. The communications device according to claim 17, wherein the instructions further comprise instructions to:

receive codebook configuration information, before performing power adjustment on the Q codebooks, wherein the codebook configuration information indicates the Q codebooks and the Q power factors allocated to the communications device.

24. The communications device according to claim 17, wherein the communications device is a base station or a user terminal.

* * * * *